(12) United States Patent
Montgomery et al.

(10) Patent No.: US 11,837,192 B2
(45) Date of Patent: Dec. 5, 2023

(54) DYNAMIC DEVICE INFORMATION LUGGAGE TAG SYSTEM

(71) Applicant: Dell Products L.P., Round Rock, TX (US)

(72) Inventors: Colin Montgomery, Mountain View, CA (US); Neal Beard, Austin, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 17/395,732

(22) Filed: Aug. 6, 2021

(65) Prior Publication Data

US 2023/0041511 A1 Feb. 9, 2023

(51) Int. Cl.
*G09G 5/00* (2006.01)
*G06F 13/00* (2006.01)
*G06F 1/16* (2006.01)
*G06F 16/22* (2019.01)

(52) U.S. Cl.
CPC ........... *G09G 5/006* (2013.01); *G06F 1/1601* (2013.01); *G06F 16/22* (2019.01); *G09G 2370/22* (2013.01)

(58) Field of Classification Search
CPC ......... H04L 29/06; H04L 29/08; H04L 43/50; H04L 9/40; H04L 65/60; H04L 65/75; H04L 65/565; H04L 65/613; H04L 67/10; H04L 13/10; H04L 13/38; G06F 1/16; G06F 1/1325; G06F 1/1601; G06F 3/00; G06F 3/12; G06F 3/14; G06F 3/0481; G06F 3/0486; G06F 3/0488; G06F 21/62; G06F 21/84; G06F 16/22; G06F 9/445; G06F 9/4401; G06F 11/00; G06F 11/07;
(Continued)

(56) References Cited

U.S. PATENT DOCUMENTS

| | | | |
|---|---|---|---|
| 7,064,672 B2* | 6/2006 | Gothard | G06F 1/1605 340/693.9 |
| 2007/0198760 A1* | 8/2007 | Han | G06F 1/1632 710/303 |

(Continued)

*Primary Examiner* — Chanh D Nguyen
*Assistant Examiner* — Nguyen H Truong
(74) *Attorney, Agent, or Firm* — Joseph Mencher

(57) ABSTRACT

A device information display system includes a device information display chassis with a display device, a device information display connector that is configured to connect to a computing device connector on any of a plurality of computing devices, and a device information retrieval subsystem coupled to each of the display device and the device information display connector. The device information retrieval subsystem automatically receives first device information associated with a first computing device from the first computing device in response to the device information display connector being connected to the first computing device and, while the device information display connector is connected to the first computing device, provides the first device information for display on the display device. Subsequent to the device information display connector being disconnected from the first computing device, the device information retrieval subsystem continues to provide the first device information for display on the display device.

20 Claims, 27 Drawing Sheets

(58) Field of Classification Search
CPC ......... G06F 11/22; G06F 17/00; G09G 5/006; G09G 5/14; G09G 5/391; G09G 2370/22
See application file for complete search history.

(56) References Cited

U.S. PATENT DOCUMENTS

| | | | |
|---|---|---|---|
| 2010/0100850 A1* | 4/2010 | Unger | G06F 3/0481 715/835 |
| 2016/0045750 A1* | 2/2016 | Drees | A61N 1/37282 345/173 |
| 2018/0046425 A1* | 2/2018 | Breedvelt-Schouten | G06F 3/1454 |
| 2018/0285229 A1* | 10/2018 | Truong | G06F 11/321 |
| 2022/0072539 A1* | 3/2022 | Montgomery | B01L 3/502723 |

* cited by examiner

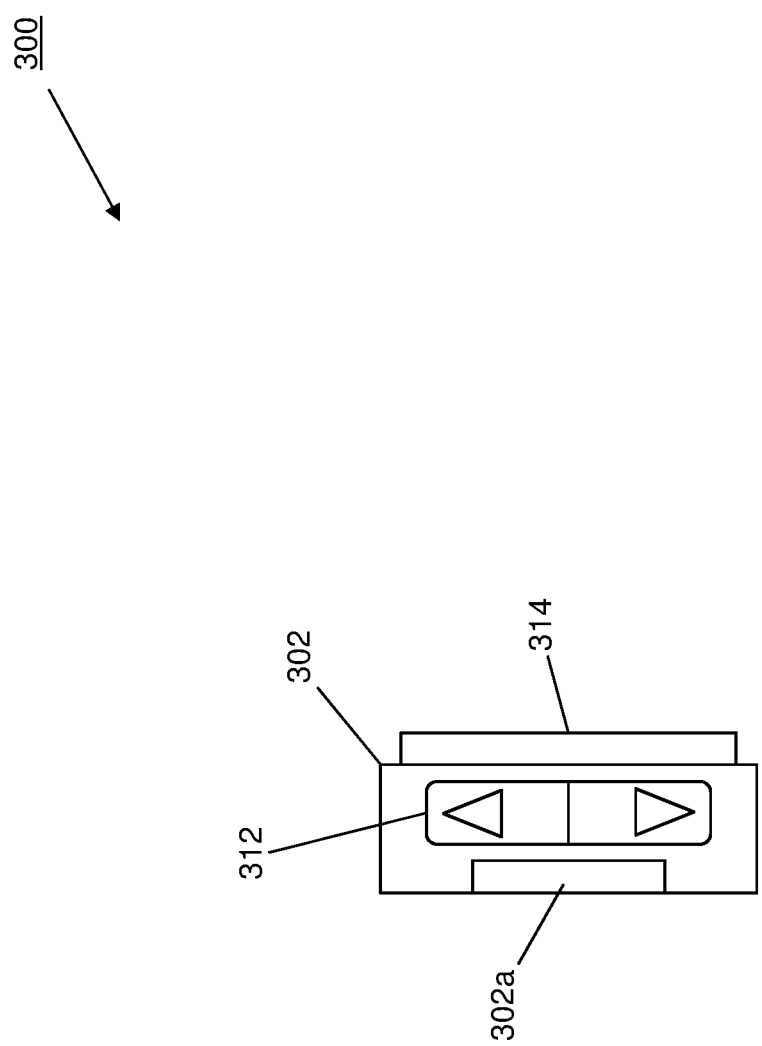

DYNAMIC DEVICE INFORMATION LUGGAGE TAG SYSTEM

BACKGROUND

The present disclosure relates generally to information handling systems, and more particularly to displaying information about information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., switch devices), server devices, storage systems, and/or other computing devices known in the art, are often included in relatively large numbers in datacenters, and as the number of computing devices in a datacenter increases, the management and maintenance requirements for those computing devices increase as well. For example, when a network administrator or other user needs to review switch device information about a switch device in the datacenter, a management device (e.g., a laptop/notebook computing device) must be configured (e.g., via appropriate drivers) and connected to the switch device (e.g., via a console cable and console port on the switch device) to allow the management device to access a Command Line Interface (CLI) for the switch device so that "show" commands may be provided via the management device and through the CLI to the switch device in order to retrieve that switch device information. As will be appreciated by one of skill in the art, such operations are time consuming, particularly when device information about several devices in the datacenter must be reviewed. Conventional solutions include providing physical device information "luggage" tags on the computing device that have device information printed thereon. However, such physical device information tags require a network administrator or other user (and/or manufacturer or other provider) of the computing device to manually provide that device information on the physical device information tag, and that device information on the physical device information tag must be changed if any of the device information for the computing device changes, which results in such physical device information tags often being limited to displaying device information that does not (or is not expected to) change.

Accordingly, it would be desirable to provide device information display system that addresses the issues discussed above.

SUMMARY

According to one embodiment, an Information Handling System (IHS) includes a plurality of computing devices; and a device information display system, comprising: a processing system; and a memory system that is coupled to the processing system and that includes instructions that, when executed by the processing system, cause the processing system to provide a device information retrieval engine that is configured to: automatically receive, from a first computing device included in the plurality of computing devices, and in response to the device information display system being connected to the first computing device, first device information associated with the first computing device; provide, for display while the device information display system is connected to the first computing device, the first device information; and provide, for display subsequent to the device information display system being disconnected from the first computing device, the first device information.

BRIEF DESCRIPTION OF THE DRAWINGS

FIG. 3C is a rear view illustrating an embodiment of the device information display system of FIGS. 3A and 3C.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
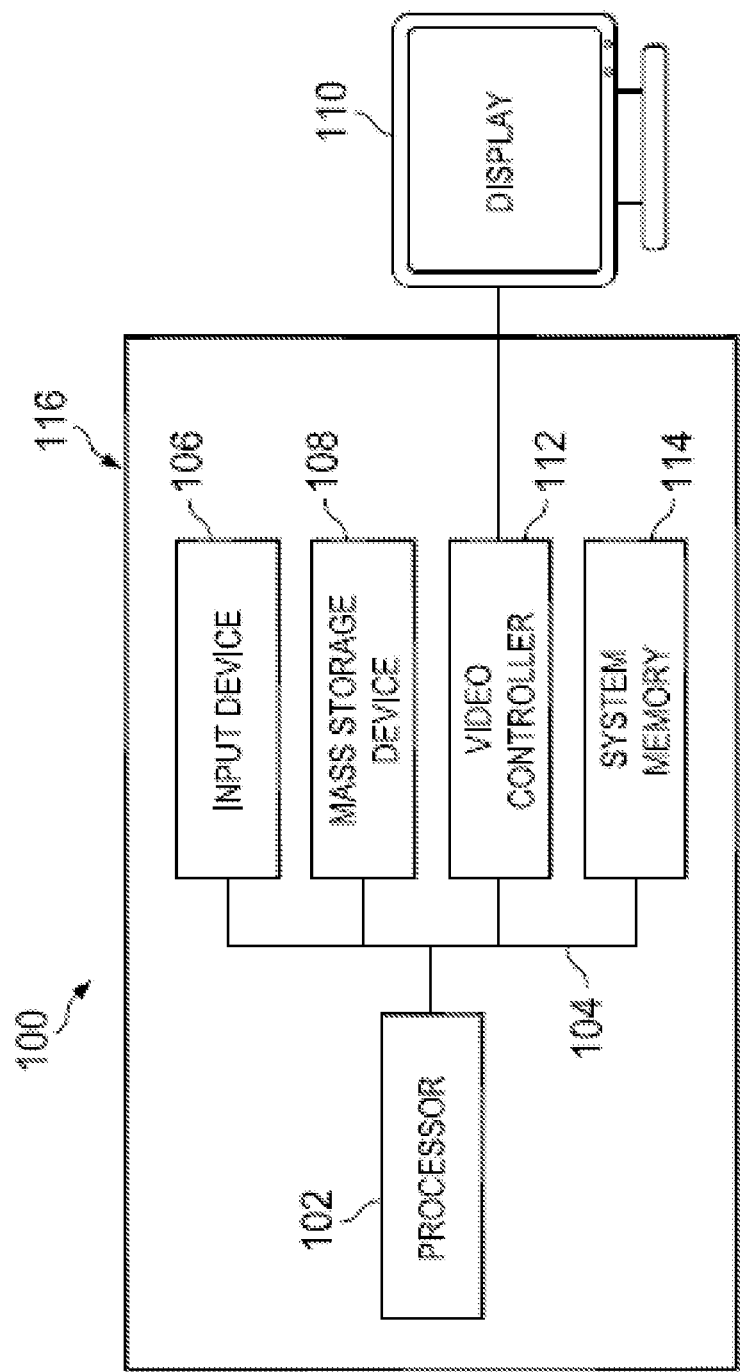
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
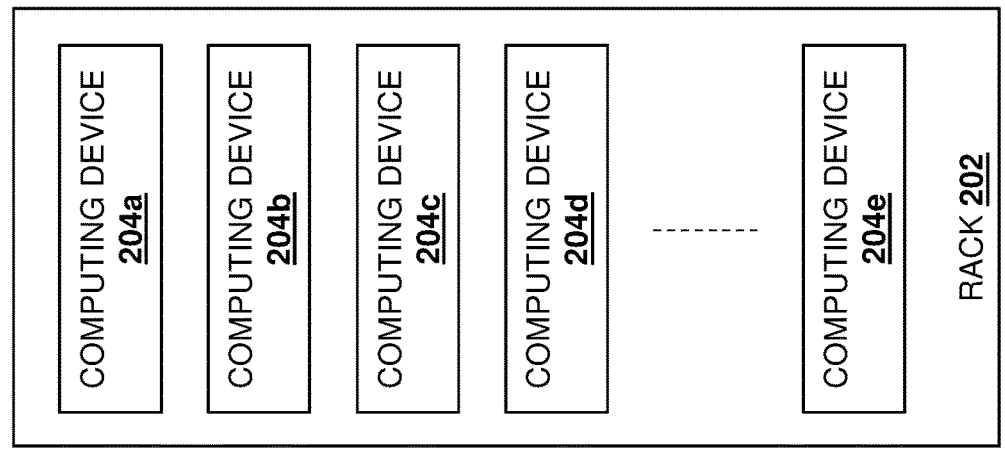
FIG. 2 is a schematic view illustrating an embodiment of a plurality of computing devices that are included in a rack.

Referring now to FIG. 2, an embodiment of a datacenter 200 is illustrated that may utilize the device information display system of the present disclosure. In the illustrated embodiment, the datacenter 200 includes a rack 202 housing a plurality of computing devices 204a, 204b, 204c, 204d, and up to 204e, and one of skill in the art in possession of the present disclosure will appreciate that the datacenter 200 may include a plurality of racks similar to the rack 202 while remaining within the scope of the present disclosure as well. In an embodiment, any or all of the computing devices 204a-204e may be provided by the IHS 100 discussed above with reference to FIG. 1, and/or may include some or all of the components of the IHS 100, and in the specific examples are illustrated and described below as being provided by networking devices such as switch devices. However, while illustrated and discussed as being provided by networking devices such as switch devices, one of skill in the art in possession of the present disclosure will recognize that computing devices 204a-204e provided in the rack 202 of the datacenter 200 may include other computing devices (e.g., server devices, storage systems, etc.) that may be configured to operate similarly as the computing devices 202a-202e discussed below. Furthermore, while the computing devices 204a-204e utilizing the device information display system of the present disclosure are illustrated and described as being included in a rack in a datacenter, one of skill in the art in possession of the present disclosure will appreciate that computing devices provided in a variety of other applications may utilize the device information display system of the present disclosure while remaining within the scope of the present disclosure as well.

Figure 3A:
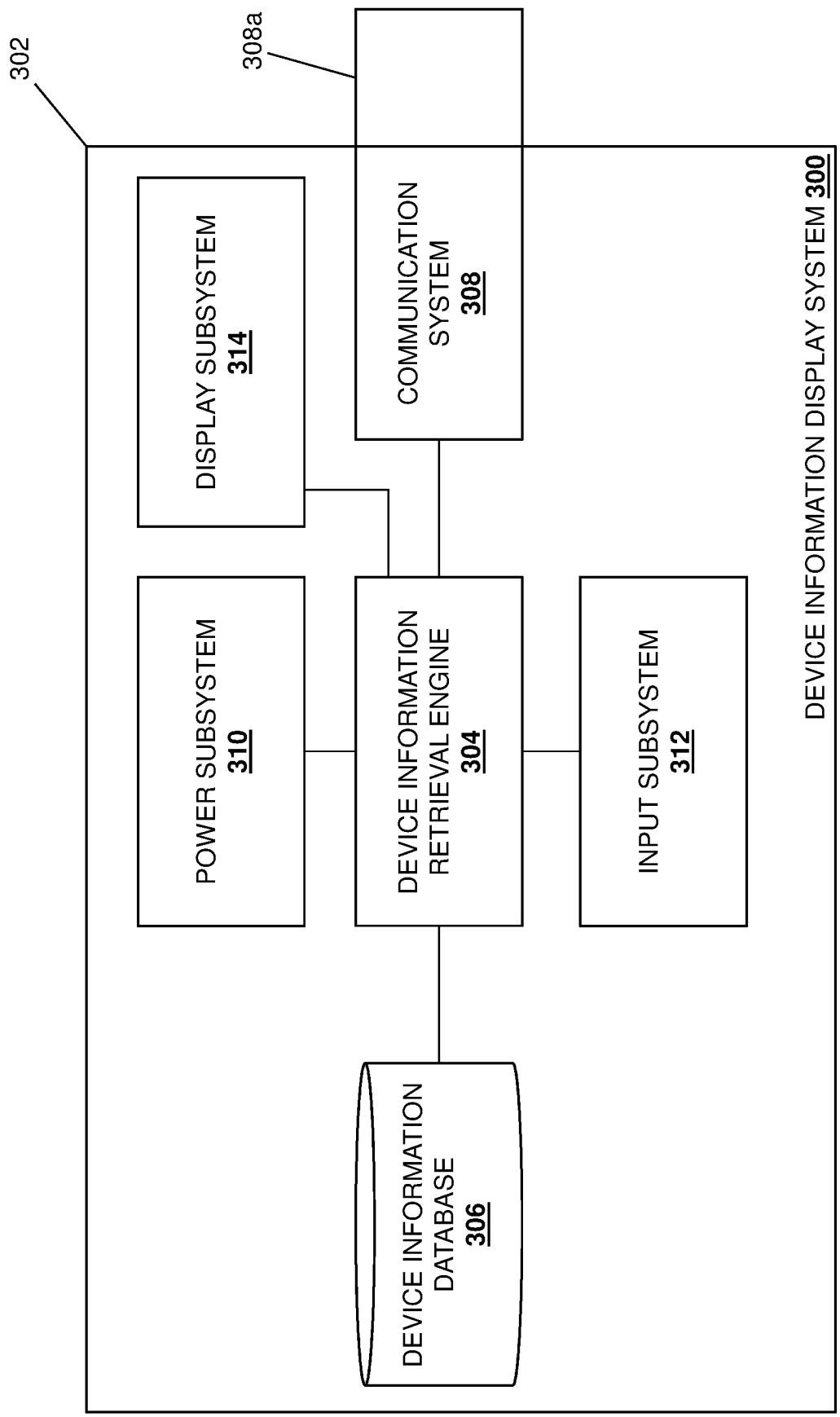
FIG. 3A is a schematic view illustrating an embodiment of a device information display system that may be used with any of the computing devices of FIG. 2.
Figure 3B:
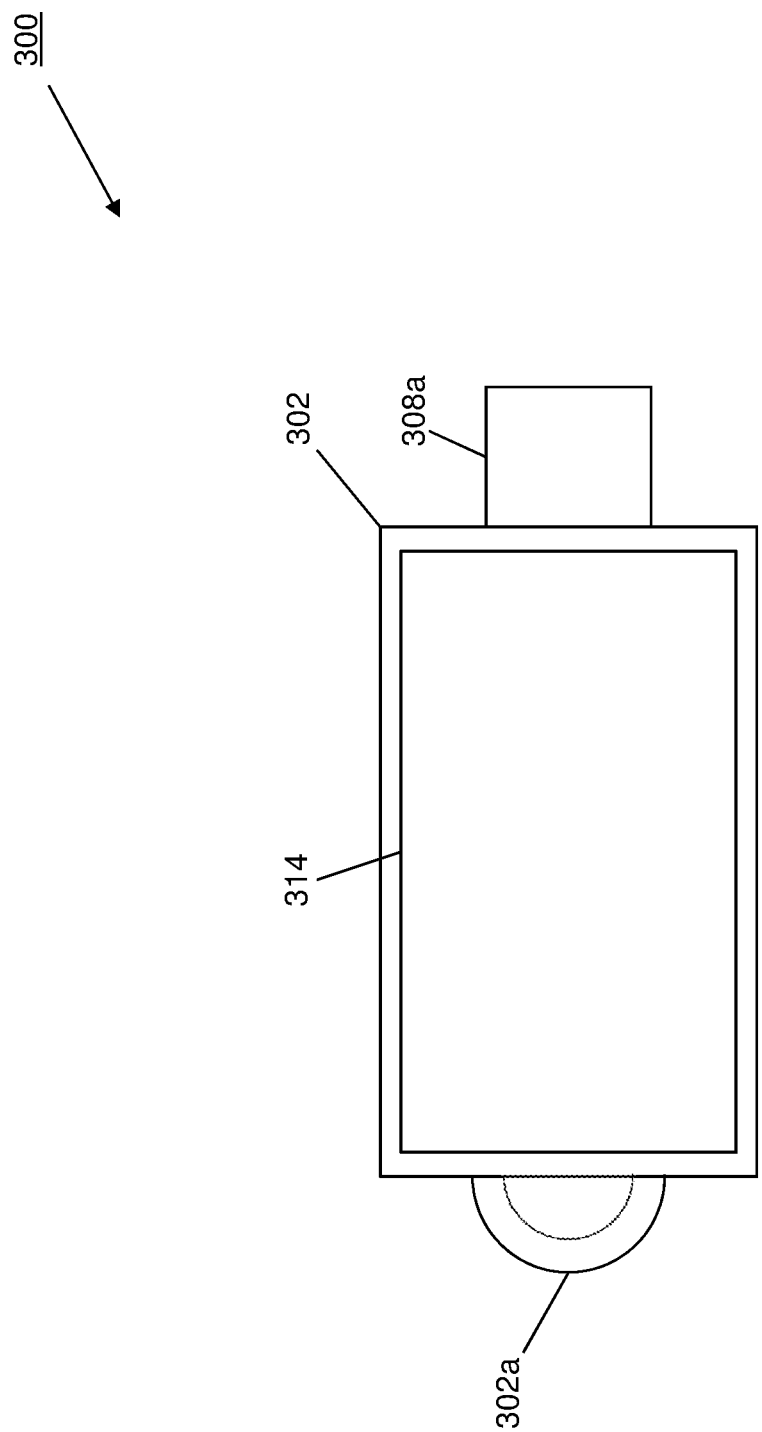
FIG. 3B is a side view illustrating an embodiment of the device information display system of FIG. 3A.

Referring now to FIGS. 3A, 3B, and 3C, an embodiment of a device information display system 300 is illustrated. In the illustrated embodiment, the device information display system 300 includes a chassis 302 that houses the components of the device information display system 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a device information retrieval engine 304 that is configured to perform the functionality of the device information retrieval engines/subsystems and/or device information display systems discussed below. In some of the embodiments illustrated and discussed below, the chassis 300 includes a loop/handle element 302a that may be utilized to connect the device information display system 300 to a keychain or other carrier, to handle the device information display system 300 (e.g., to remove the device information display system 300 from a housing defined by a chassis), and/or for any of a variety of other reasons that would be apparent to one of skill in the art in possession of the present disclosure.

The chassis 302 may also house a storage system (not illustrated, but which may include the storage 108 discussed above with reference to FIG. 1) that is coupled to the device information retrieval engine 304 (e.g., via a coupling between the storage system and the processing system) and that includes a device information database 306 that is configured to store any of the information utilized by the device information retrieval engine 304 discussed below. The chassis 302 may also house a communication system 308 that is coupled to the device information retrieval engine 304 (e.g., via a coupling between the communication system 308 and the processing system) and that include a connector 308a that is illustrated and discussed below as being provided by a Universal Serial Bus (USB) connector, but one of skill in the art in possession of the present disclosure will appreciate how the communication system 308 may include any of a variety of other types of connectors while remaining within the scope of the present disclosure as well.

The chassis 302 may also house a power subsystem 310 that is coupled to the device information retrieval engine 304 (e.g., via a coupling between the power subsystem 310 and the processing system) and that may include any of a variety of battery devices (e.g., a lithium-ion battery) known in the art. The chassis 302 may also house an input subsystem 312 that is coupled to the device information retrieval engine 304 (e.g., via a coupling between the input subsystem 312 and the processing system) and that is illustrated in FIG. 3C and described in some of the embodiments below as including a physical input device on the surface of the chassis 302, but one of skill in the art in possession of the present disclosure will appreciate how the input subsystem 312 may be provided via Graphical User Interface (GUI) elements on a touch-screen display device while remaining within the scope of the present disclosure as well.

The chassis 302 may also house a display subsystem 314 that is coupled to the device information retrieval engine 304 (e.g., via a coupling between the display subsystem 314 and the processing system) and that is provided on an outer surface of the chassis 302. For example, the display subsystem 314 may include an electronic ink (e-ink) display device, a Liquid Crystal Display (LCD), a dot matrix display device, a Light Emitting Device (LED) display device, and/or any of a variety of other types of display devices that would be apparent to one of skill in the art in possession of the present disclosure. However, while a specific device information display system 300 has been illustrated, one of skill in the art in possession of the present disclosure will recognize that device information display systems (or other devices operating according to the teachings of the present disclosure in a manner similar to that described below for the device information display system 300) may include a variety of components and/or component configurations for providing the functionality discussed below while remaining within the scope of the present disclosure as well.

Figure 4:
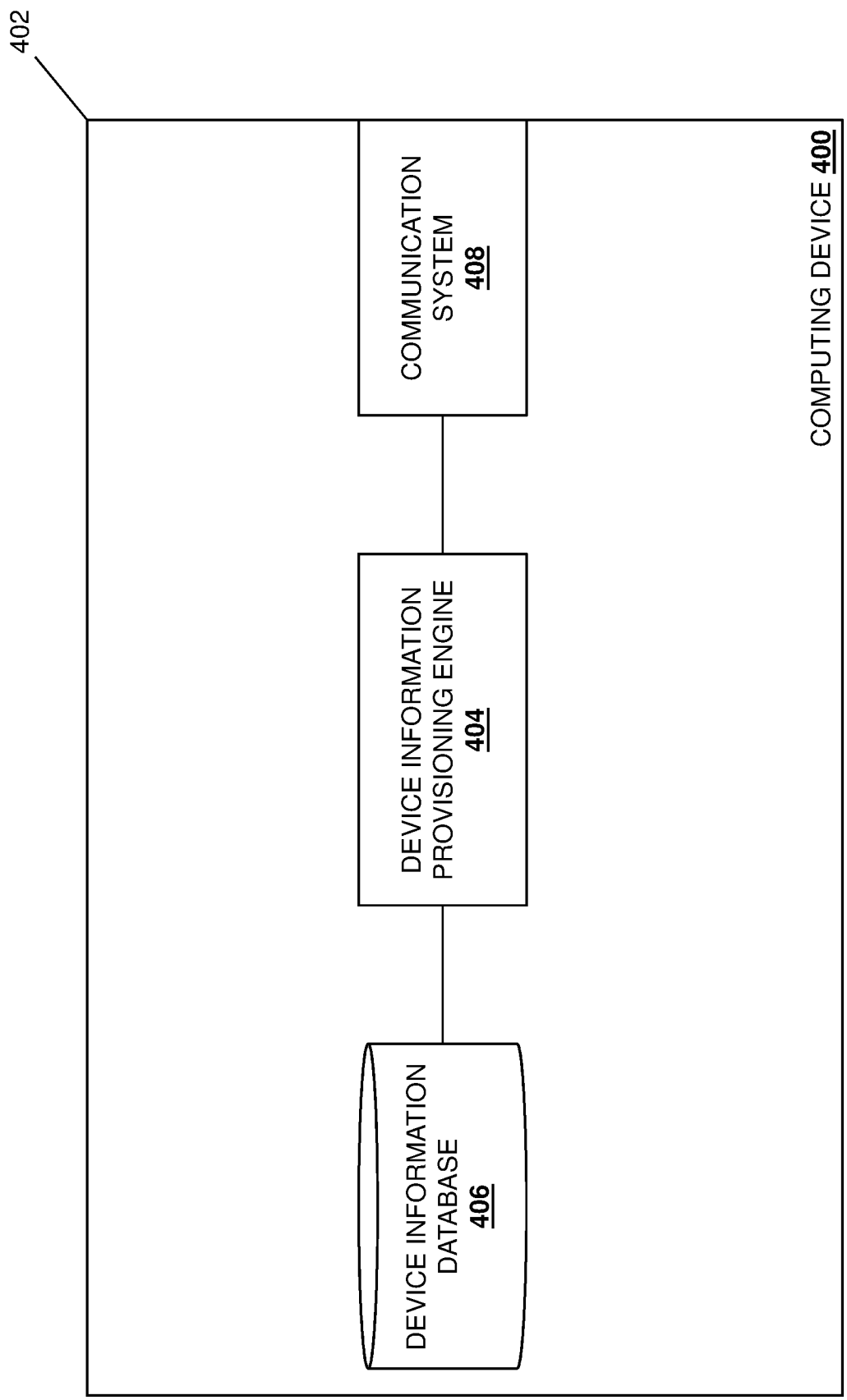
FIG. 4 is a schematic view illustrating an embodiment of a computing device that may be included in the rack of FIG. 2.

Referring now to FIG. 4, an embodiment of a computing device 300 is illustrated that may provide any of the computing devices 204a-204e discussed above with reference to FIG. 2. As such, the computing device 400 may be provided by the IHS 100 discussed above with reference to FIG. 1 and/or may include some or all of the components of the IHS 100, and in the specific examples below is illustrated and described as being provided by a networking device such as a switch device. However, while illustrated and discussed as being provided by a networking device such as a switch device, one of skill in the art in possession of the present disclosure will recognize that the functionality of the computing device 400 discussed below may be provided by other computing devices (e.g., server devices, storage systems, etc.) that are configured to operate similarly as the computing device 400 discussed below. In the illustrated embodiment, the computing device 400 includes a chassis 402 that houses the components of the computing device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a device information provisioning engine 404 that is configured to perform the functionality of the device information provisioning engines and/or computing devices discussed below.

The chassis 402 may also house a storage system (not illustrated, but which may include the storage 108 discussed above with reference to FIG. 1) that is coupled to the device information provisioning engine 404 (e.g., via a coupling between the storage system and the processing system) and that includes a device information database 406 that is configured to store any of the information utilized by the device information provisioning engine 404 discussed below. The chassis 402 may also house a communication system 408 that is coupled to the device information provisioning engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 400 has been illustrated and described, one of skill in the art in possession of the present disclosure will recognize that computing devices (or other devices operating according to the teachings of the present disclosure in a manner similar to that described below for the computing device 400) may include a variety of components and/or component configurations for providing conventional computing device functionality, as well as the functionality discussed below, while remaining within the scope of the present disclosure as well.

Figure 5A:
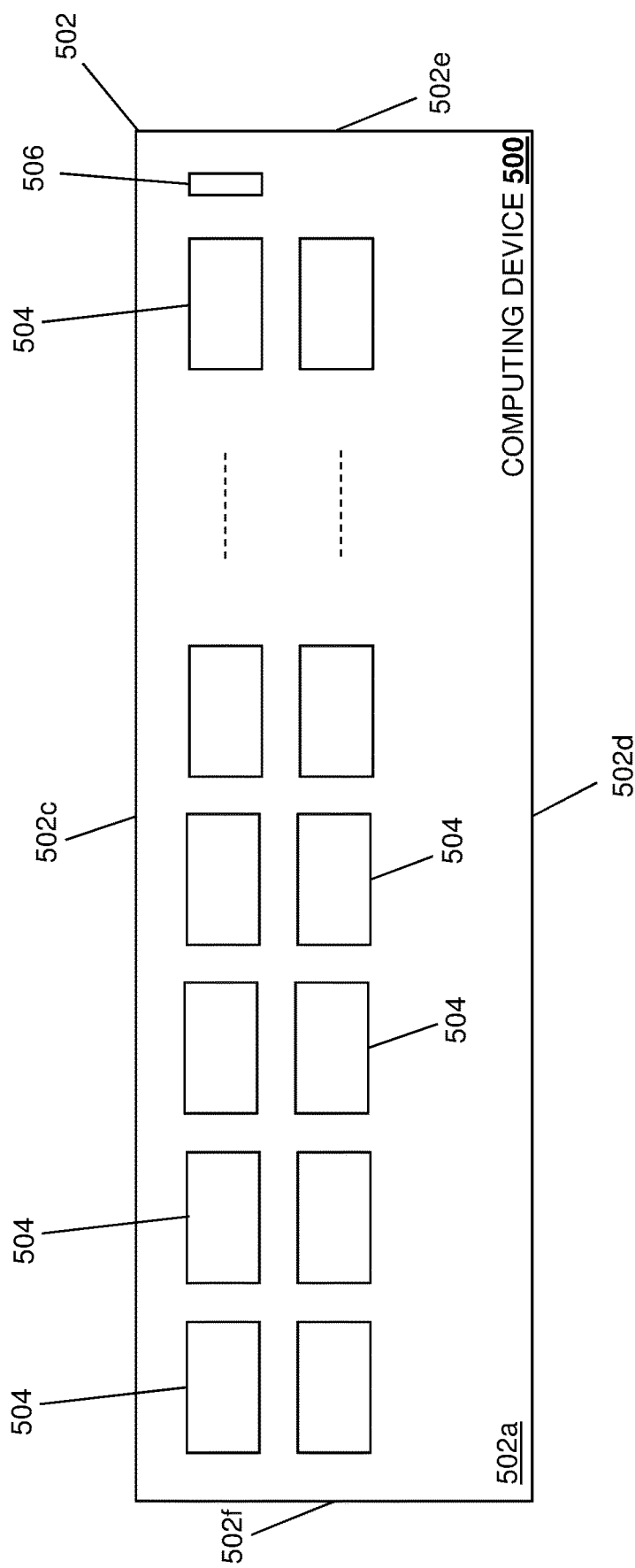
FIG. 5A is a schematic front view illustrating an embodiment of the computing device of FIG. 4.
Figure 5B:
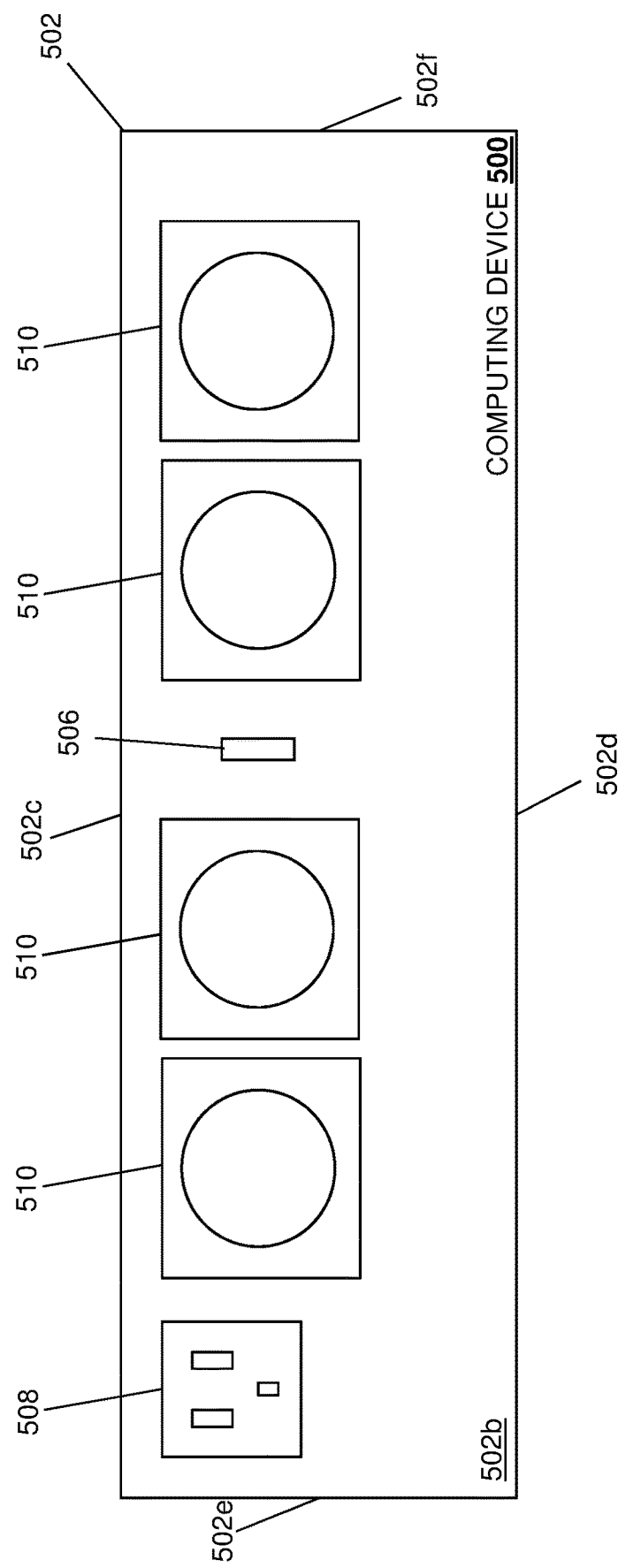
FIG. 5B is a schematic rear view illustrating an embodiment of the computing device of FIG. 4.
Figure 5C:
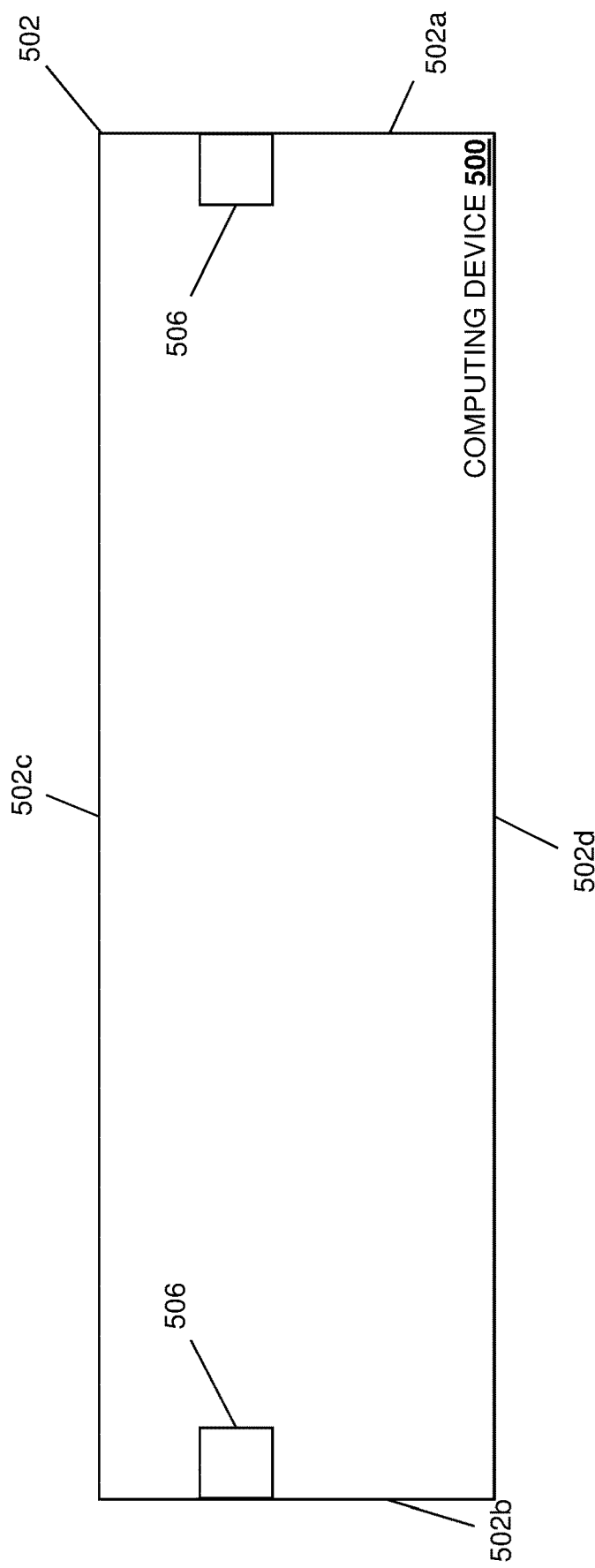
FIG. 5C is a schematic side view illustrating an embodiment of the computing device of FIG. 4.

Referring now to FIGS. 5A, 5B, and 5C, a computing device 500 is illustrated that may provide a specific embodiment of the computing device 400 discussed above with reference to FIG. 4 that allows the device information display system 300 discussed above with reference to FIGS. 3A-3C to connect to and extend from a surface of the computing device 500. For example, the computing device 500 includes a chassis 502 that may be the chassis 402 discussed above with reference to FIG. 4, and that includes a front surface 502a, a rear surface 502b that is located opposite the chassis 502 from the front surface 502a, a top surface 502c that extends between the front surface 502a and the rear surface 502b, a bottom surface 502d that is located opposite the chassis 502 from the top surface 502c and that extends between the front surface 502a and the rear surface 502b, and a pair of side surfaces 502e and 502f that are located opposite the chassis 502 from each other and that each extend between the front surface 502a, the rear surface 502b, the top surface 502c, and the bottom surface 502d.

The computing device 500 also includes a plurality of device ports 504 that are located on the front surface 502a of the chassis 502 and that may be part of the communication system 408 discussed above with reference to FIG. 4, and one of skill in the art in possession of the present disclosure will recognize that the device ports 504 may be networking ports on a networking device such as a switch device. The chassis 502 may also include a power coupling 508 that is located on the rear surface 502b and adjacent the side surface 502e, along with a plurality of fan devices 510 that are located on the rear surface 502b between the power coupling 508 and the side surface 502f.

In the illustrated embodiment, the computing device 500 also includes a computing device connector 506 on the front surface 502a of the chassis 502 (e.g., between the device ports 504 and the side surface 502e), and a computing device connector 506 on the rear surface 502b of the chassis 502 (e.g., midway between the side surfaces 502e and 502f and between pairs of the fan devices 510), both of which may be part of the communication system 408 discussed above with reference to FIG. 4. However, while illustrated and described as being included on both the front surface 502a and the rear surface 502b of the chassis 502, one of skill in the art in possession of the present disclosure will appreciate that only a single computing device connector 506 may be included on either the front surface 502a or the rear surface 502b of the chassis 502 while remaining within the scope of the present disclosure as well. In the examples illustrated and discussed below, the computing device connector(s) 506 are described as being provided by USB connectors, but one of skill in the art in possession of the present disclosure will appreciate how the computing device connector(s) 506 may be provided by any of a variety of connectors that are configured to connect to the device information display system 300 discussed above with reference to FIGS. 3A-3C. However, while a specific computing device 500 has been illustrated and described, one of skill in the art in possession of the present disclosure will appreciate how the computing device 500 may include a variety of components and component configurations while remaining within the scope of the present disclosure as well.

Figure 6A:
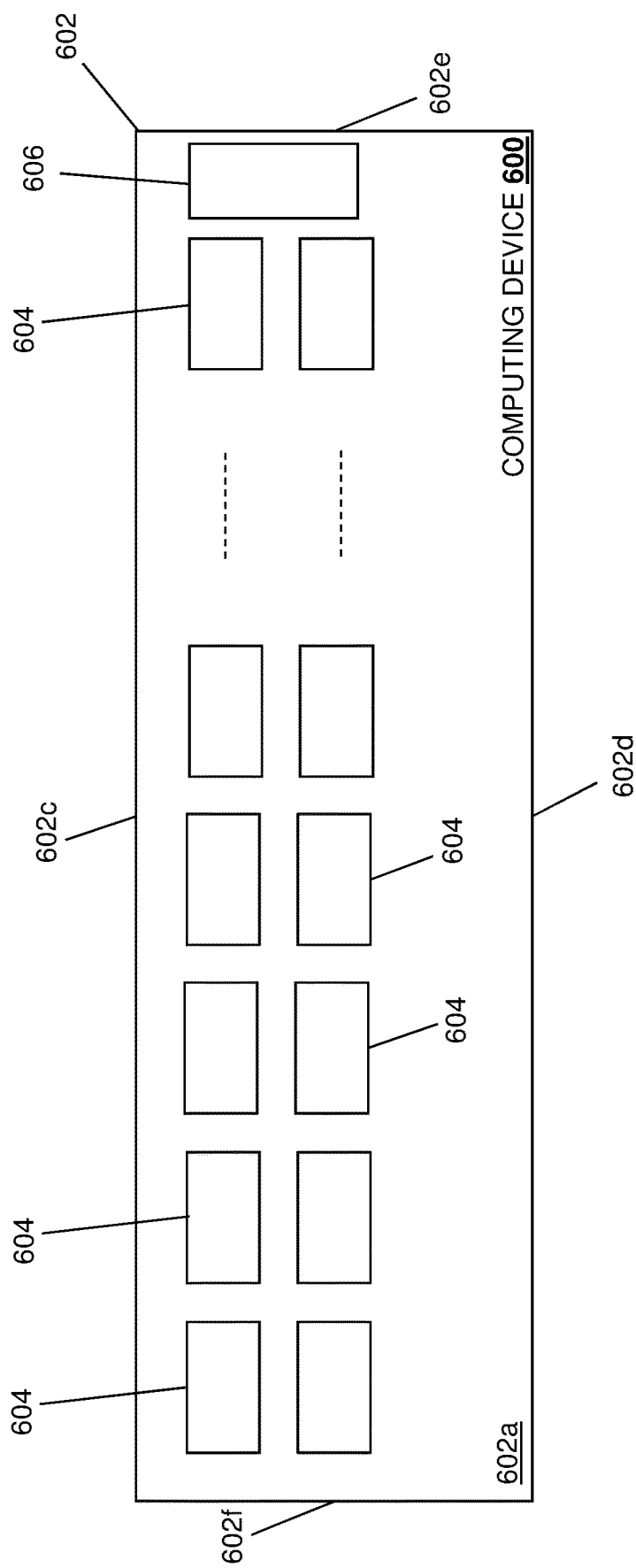
FIG. 6A is a schematic front view illustrating an embodiment of the computing device of FIG. 4.
Figure 6B:
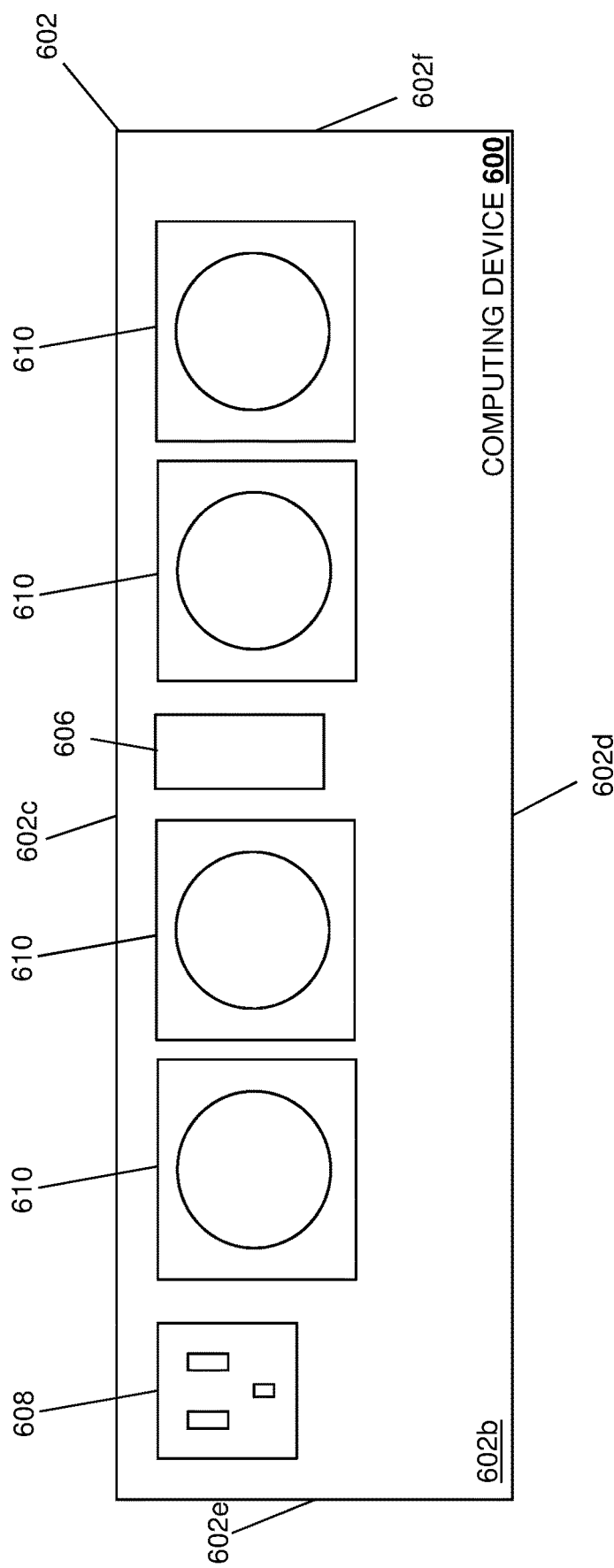
FIG. 6B is a schematic rear view illustrating an embodiment of the computing device of FIG. 4.
Figure 6C:
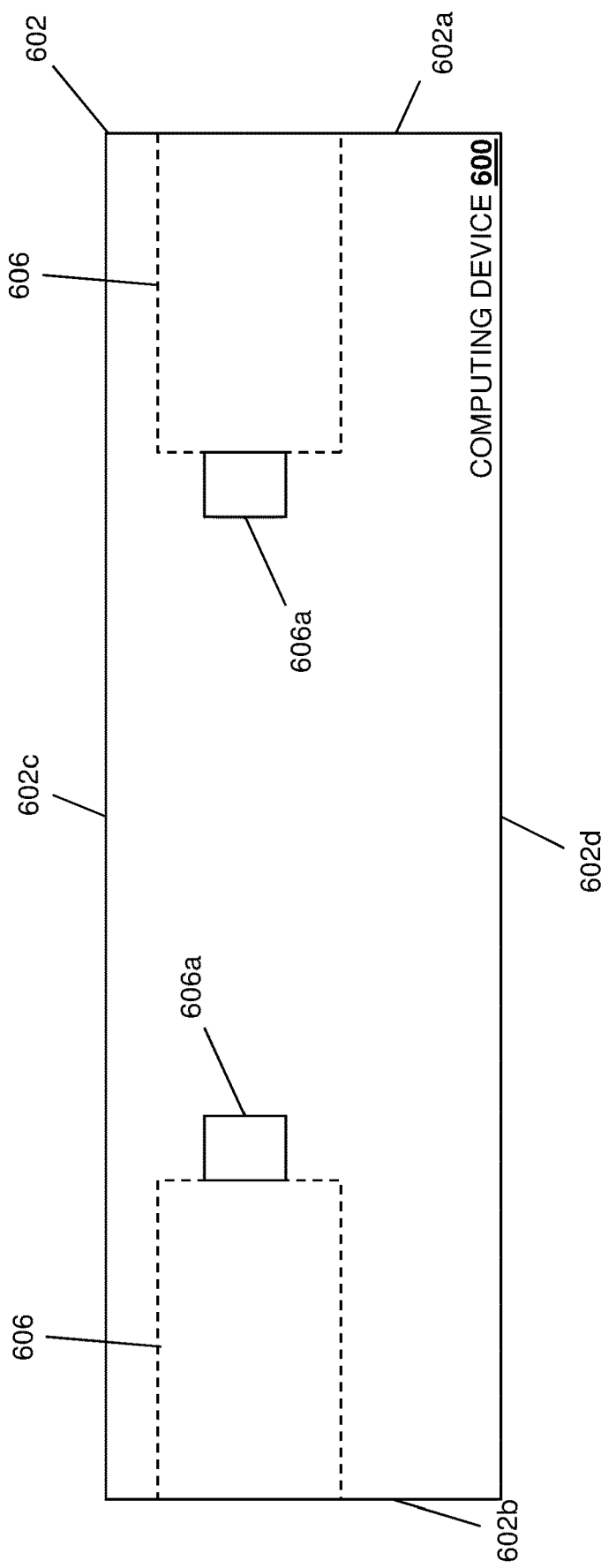
FIG. 6C is a schematic side view illustrating an embodiment of the computing device of FIG. 4.

Referring now to FIGS. 6A, 6B, and 6C, a computing device 600 is illustrated that may provide a specific embodiment of the computing device 400 discussed above with reference to FIG. 4 that allows the device information display system 300 discussed above with reference to FIGS. 3A-3C to connect to and be housed within the computing device 600. For example, the computing device 600 includes a chassis 602 that may be the chassis 402 discussed above with reference to FIG. 4, and that includes a front surface 602a, a rear surface 602b that is located opposite the chassis 602 from the front surface 602a, a top surface 602c that extends between the front surface 602a and the rear surface 602b, a bottom surface 602d that is located opposite the chassis 602 from the top surface 602c and that extends between the front surface 602a and the rear surface 602b, and a pair of side surfaces 602e and 602f that are located opposite the chassis 602 from each other and that each extend between the front surface 602a, the rear surface 602b, the top surface 602c, and the bottom surface 602d.

The computing device 600 also includes a plurality of device ports 604 that are located on the front surface 602a of the chassis 602 and that may be part of the communication system 408 discussed above with reference to FIG. 4, and one of skill in the art in possession of the present disclosure will recognize that the device ports 604 may be networking ports on a networking device such as a switch device. The chassis 602 may also include a power coupling 608 that is located on the rear surface 602b and adjacent the side surface 602e, along with a plurality of fan devices 610 that are located on the rear surface 602b between the power coupling 608 and the side surface 602f.

In the illustrated embodiment, the computing device 600 also includes a device information display chassis housing 606 that is defined by the chassis 602 and extends into the front surface 602a of the chassis 602 (e.g., between the device ports 604 and the side surface 602e), along with the computing device connector 606a that is located opposite the device information display chassis housing 606 from the front surface 602a and that may be part of the communication system 408 discussed above with reference to FIG. 4. In the illustrated embodiment, the computing device 600 also includes a device information display chassis housing 606 that is defined by the chassis 602 and extends into the rear surface 602b of the chassis 602 (e.g., midway between the side surfaces 602e and 602f and between pairs of the fan devices 610), along with the computing device connector 606a that is located opposite the device information display chassis housing 606 from the rear surface 602b and that may be part of the communication system 408 discussed above with reference to FIG. 4.

However, while illustrated and described as being included on adjacent the front surface 602a and the rear surface 602b of the chassis 602, one of skill in the art in possession of the present disclosure will appreciate that only a single device information display chassis housing 606 and single computing device connector 606a may be included adjacent either the front surface 602a or the rear surface 602b of the chassis 602 while remaining within the scope of the present disclosure as well. In the examples illustrated and discussed below, the computing device connector(s) 606a are described as being provided by USB connectors, but one of skill in the art in possession of the present disclosure will appreciate how the computing device connector(s) 606a may be provided by any of a variety of connectors that are configured to connect to the device information display system 300 discussed above with reference to FIGS. 3A-3C. However, while a specific computing device 600 has been illustrated and described, one of skill in the art in possession of the present disclosure will appreciate how the computing device 600 may include a variety of components and component configurations while remaining within the scope of the present disclosure as well.

Figure 7A:
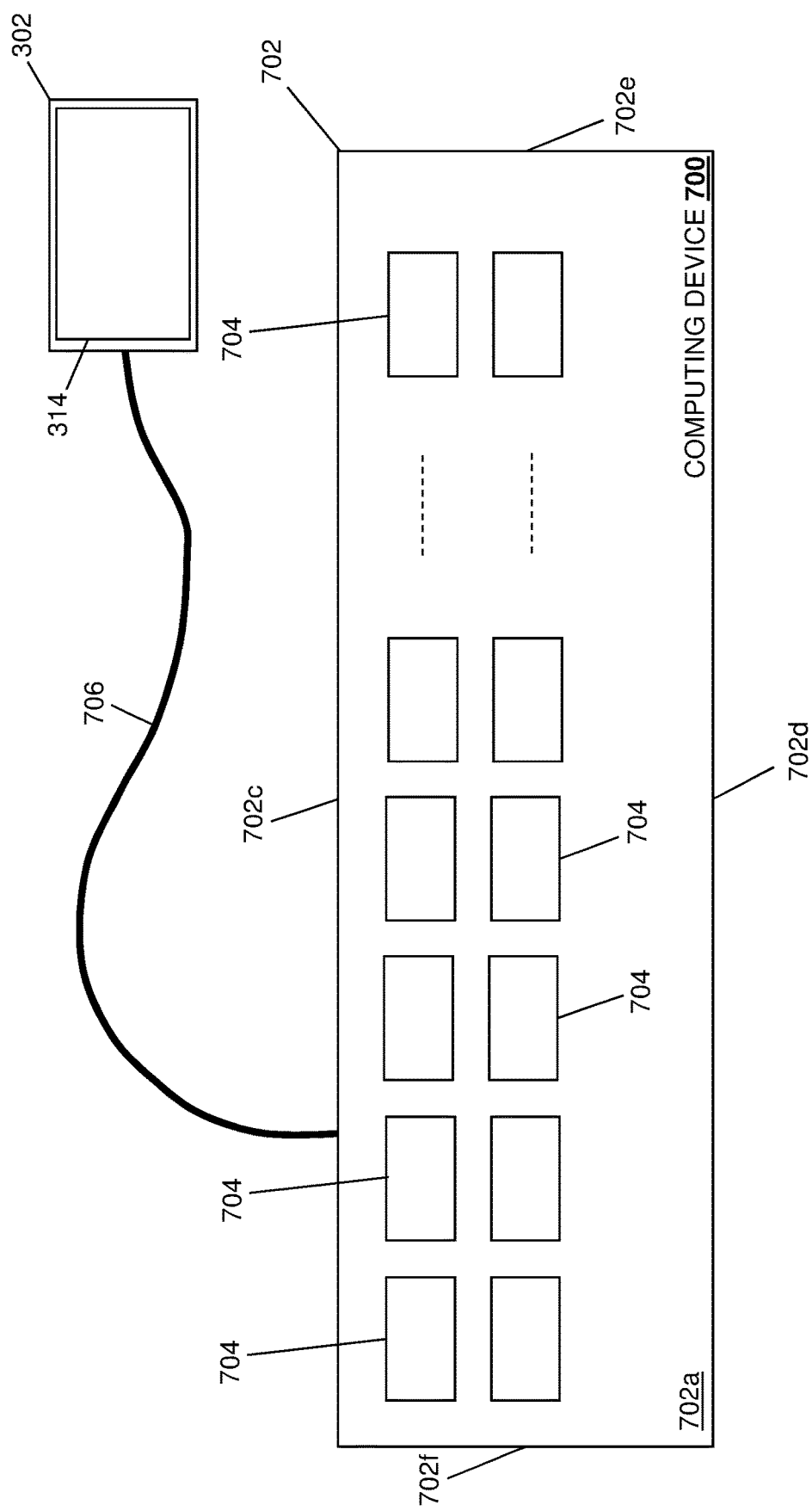
FIG. 7A is a schematic front view illustrating an embodiment of the computing device of FIG. 4.
Figure 7B:
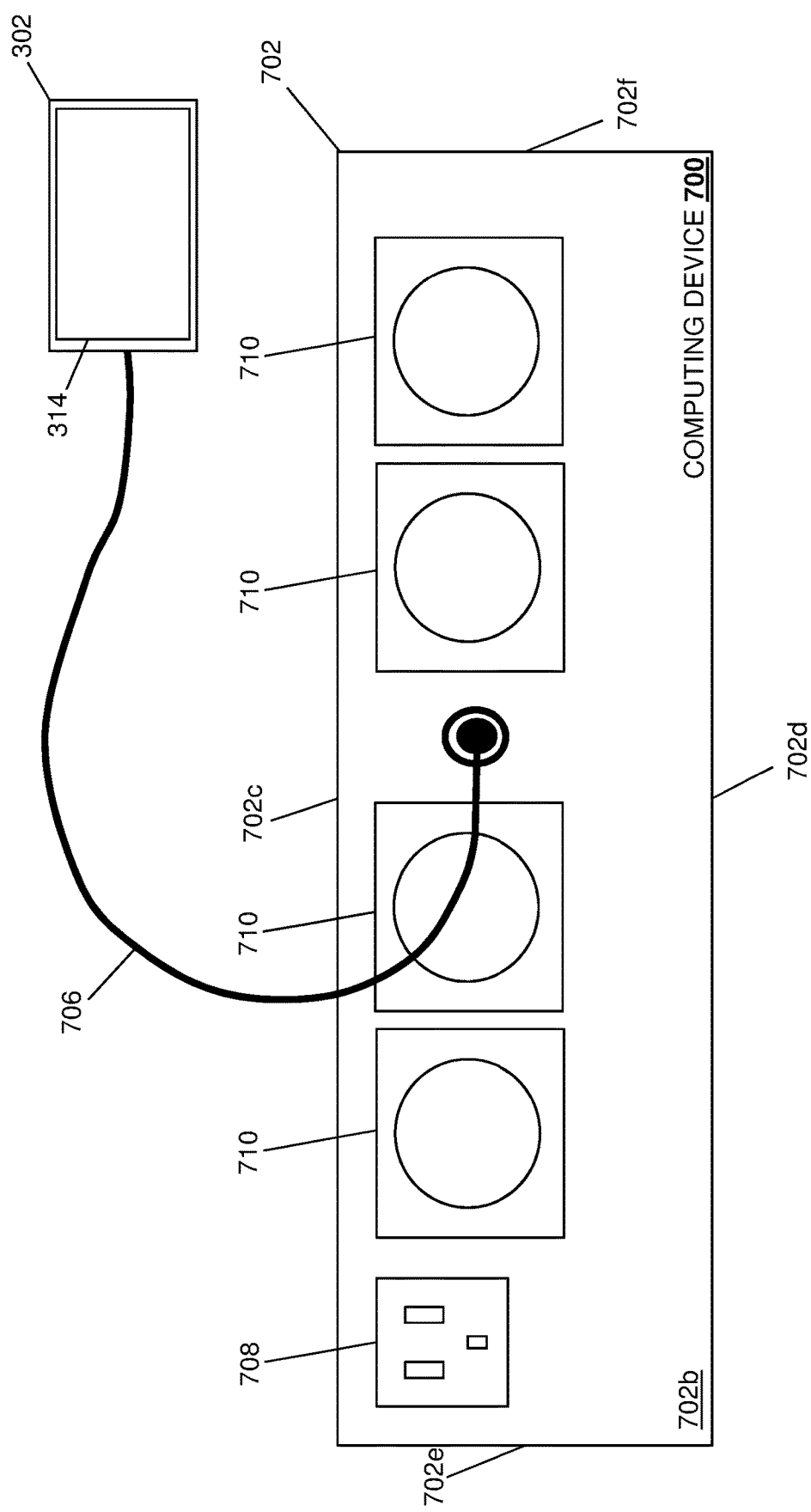
FIG. 7B is a schematic rear view illustrating an embodiment of the computing device of FIG. 4.
Figure 7C:
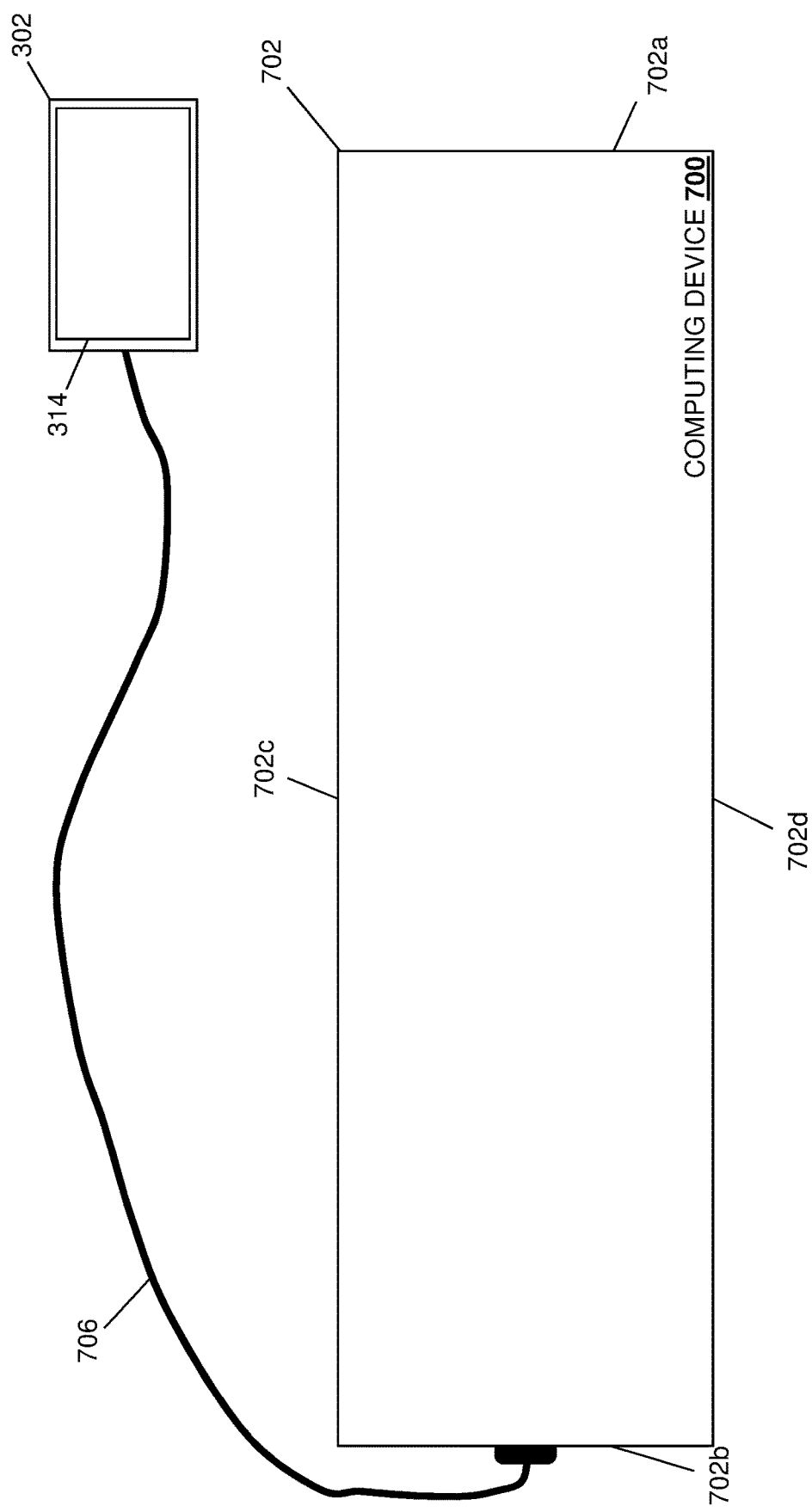
FIG. 7C is a schematic side view illustrating an embodiment of the computing device of FIG. 4.

Referring now to FIGS. 7A, 7B, and 7C, a computing device 700 is illustrated that may provide a specific embodiment of the computing device 400 discussed above with reference to FIG. 4 that includes the device information display system 300 discussed above with reference to FIGS. 3A-3C wired to the computing device 700. For example, the computing device 700 includes a chassis 702 that may be the chassis 402 discussed above with reference to FIG. 4, and that includes a front surface 702a, a rear surface 702b that is located opposite the chassis 702 from the front surface 702a, a top surface 702c that extends between the front surface 702a and the rear surface 702b, a bottom surface 702d that is located opposite the chassis 702 from the top surface 702c and that extends between the front surface 702a and the rear surface 702b, and a pair of side surfaces 702e and 702f that are located opposite the chassis 702 from each other and that each extend between the front surface 702a, the rear surface 702b, the top surface 02c, and the bottom surface 6072d.

The computing device 700 also includes a plurality of device ports 704 that are located on the front surface 702a of the chassis 702 and that may be part of the communication system 408 discussed above with reference to FIG. 4, and one of skill in the art in possession of the present disclosure will recognize that the device ports 704 may be networking ports on a networking device such as a switch device. The chassis 702 may also include a power coupling 708 that is located on the rear surface 702b and adjacent the side surface 702e, along with a plurality of fan devices 710 that are located on the rear surface 702b between the power coupling 708 and the side surface 702f.

In the illustrated embodiment, the computing device 700 also includes a wired device information display system communication coupling 706 that extends from the rear surface 702a of the chassis 702 (e.g., between the side surface 702e and 702f and between pairs of the fan devices 710), and that may be coupled to the communication system 408 discussed above with reference to FIG. 4. In the illustrated embodiment, an embodiment of the device information display system 300 discussed above with reference to FIGS. 3A-3C is coupled to the wired device information display system communication coupling 706, and one of skill in the art in possession of the present disclosure will appreciate how that embodiment of the device information display system 300 illustrated in FIGS. 7A-7C may not include the loop/handle element 302a (e.g., due to the chassis 302 of the device information display system 300 illustrated in FIGS. 7A-7C being wired to the chassis 702 of the computing device 700), the connector 308a (e.g., due to device information being transmitted to the device information display system 300 illustrated in FIGS. 7A-7C via the wired device information display system communication coupling 706), or the power subsystem 310 (e.g., due to power being supplied via the wired device information display system communication coupling 706). While not illustrated or described in detail, the wired device information display system communication coupling 706 may be configured to retract into the chassis 700 and extend from the chassis 700 while remaining within the scope of the present disclosure. However, while a specific computing device 700 has been illustrated and described, one of skill in the art in possession of the present disclosure will appreciate how the computing device 700 may include a variety of components and component configurations while remaining within the scope of the present disclosure as well.

Figure 8:
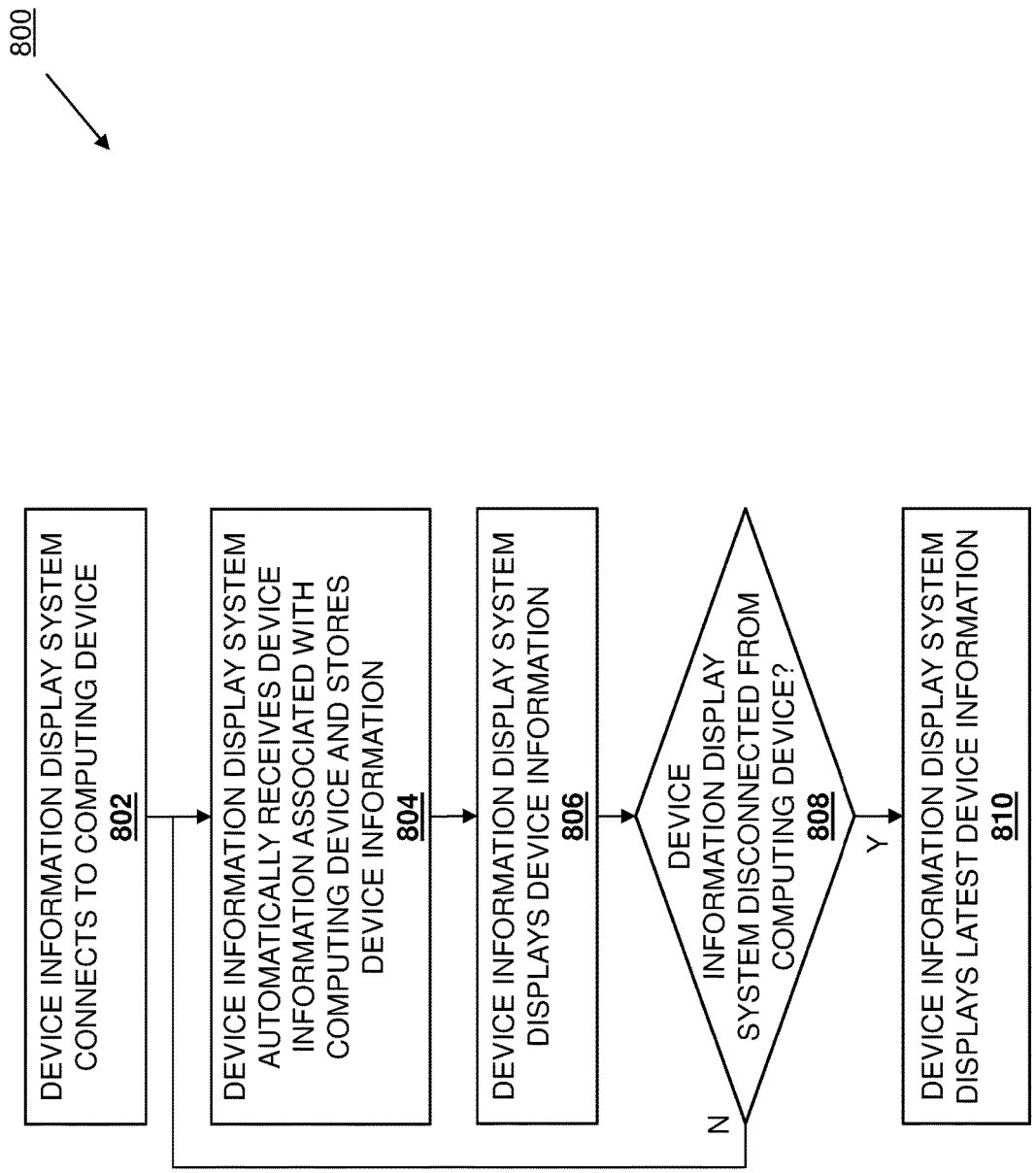
FIG. 8 is a flow chart illustrating an embodiment of a method for displaying device information.

Referring now to FIG. 8, an embodiment of a method 800 for displaying device information is illustrated. As discussed below, the systems and methods of the present disclosure provide dynamic/active device information "luggage" tags that may be connected to a computing device, receive device information about that computing device, display and update that device information, and continue to display the latest updated device information after being disconnected from that computing device. For example, the device information display system of the present disclosure may include a device information display chassis with a display device, a device information display connector that is configured to connect to a computing device connector on any of a plurality of computing devices, and a device information retrieval subsystem coupled to each of the display device and the device information display connector. The device information retrieval subsystem automatically receives first device information associated with a first computing device in response to the device information display connector being connected to the first computing device and, while the device information display connector is connected to the first computing device, provides the first device information for display on the display device. Subsequent to the device information display connector being disconnected from the first computing device, the device information retrieval subsystem continues to provide the first device information for display on the display device. As such, the deficiencies and limitations of conventional physical device information "luggage" tags are eliminated, allowing a user to use a single dynamic/active device information "luggage" tag to retrieve and view the latest information about any computing device.

Figure 9A:
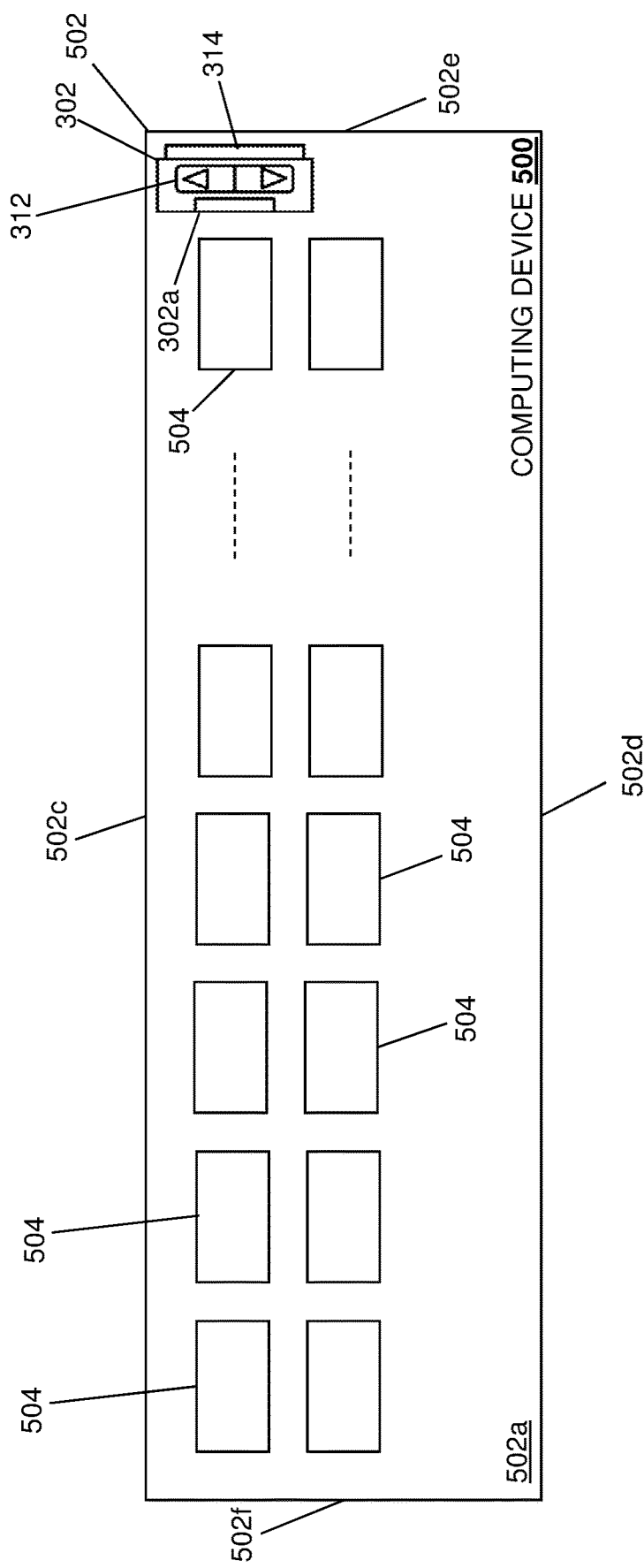
FIG. 9A is a schematic view illustrating an embodiment of the device information display system of FIGS. 3A-3C connected to the computing device of FIGS. 5A-5C during the method of FIG. 8.
Figure 9B:
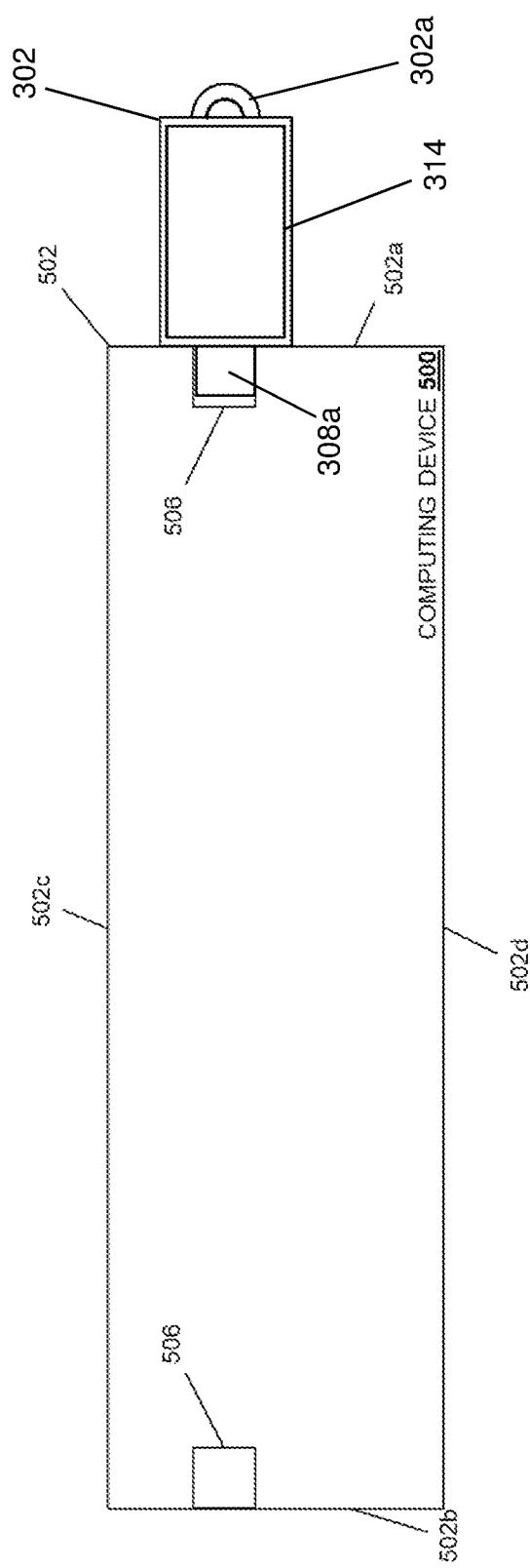
FIG. 9B is a schematic view illustrating an embodiment of the device information display system of FIGS. 3A-3C connected to the computing device of FIGS. 5A-5C during the method of FIG. 8.

The method 800 begins at block 802 where a device information display system connects to a computing device. With reference to FIGS. 9A and 9B, in an embodiment of block 802, the device information display system 300 may be connected to the computing device 500 by positioning the device information display system 300 adjacent the front surface 502a of the chassis 502 with the connector 308a on the device information display system 300 aligned with the computing device connector 506 on the front surface 502a of the chassis 502, and then moving the device information display system 300 towards the computing device 500 such that the connector 308a on the device information display system 300 engages the computing device connector 506 on the front surface 502a of the chassis 502.

Figure 9C:
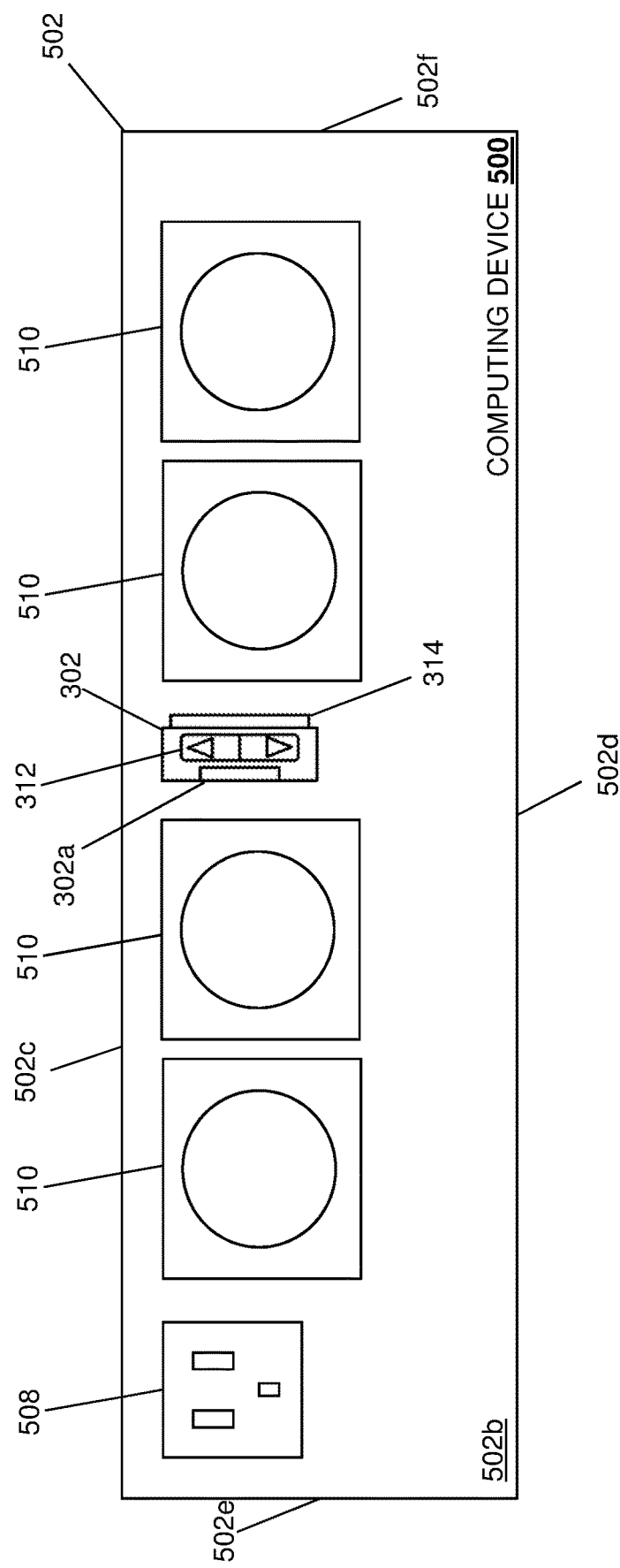
FIG. 9C is a schematic view illustrating an embodiment of the device information display system of FIGS. 3A-3C connected to the computing device of FIGS. 5A-5C during the method of FIG. 8.
Figure 9D:
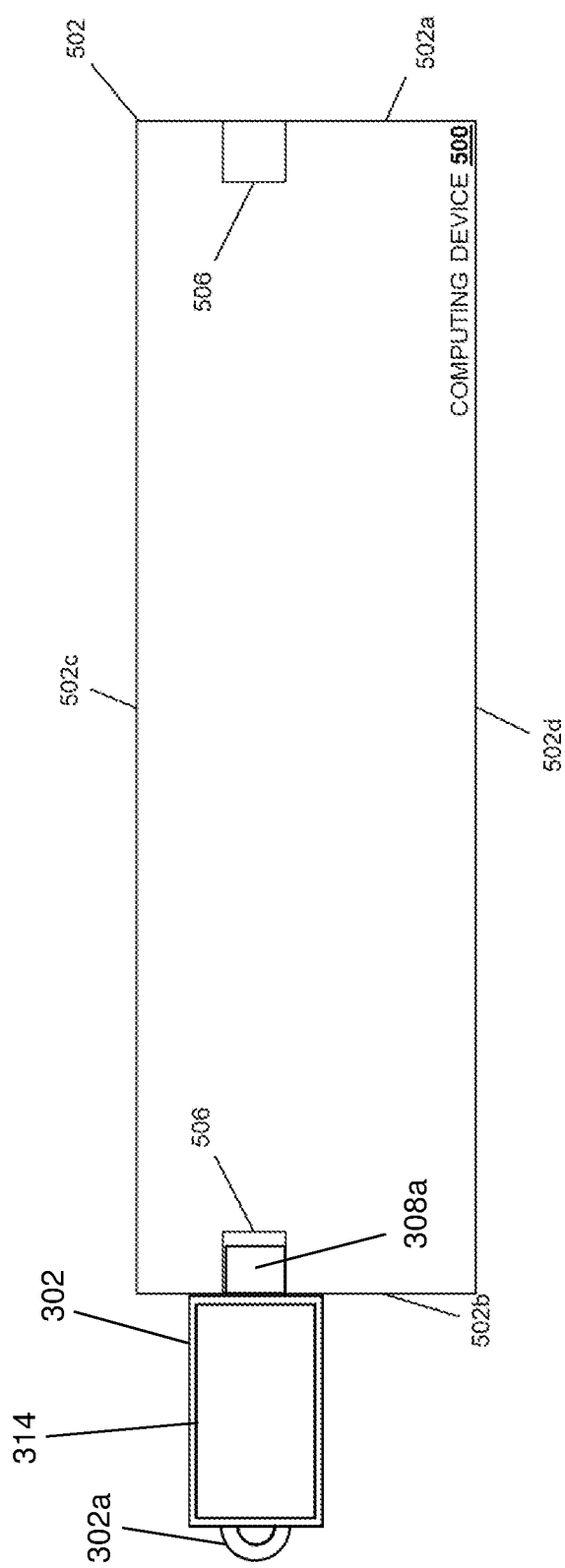
FIG. 9D is a schematic view illustrating an embodiment of the device information display system of FIGS. 3A-3C connected to the computing device of FIGS. 5A-5C during the method of FIG. 8.

Similarly, with reference to FIGS. 9C and 9D, in an embodiment of block 802, the device information display system 300 may be connected to the computing device 500 by positioning the device information display system 300 adjacent the rear surface 502b of the chassis 502 with the connector 308a on the device information display system 300 aligned with the computing device connector 506 on the rear surface 502b of the chassis 502, and then moving the device information display system 300 towards the computing device 500 such that the connector 308a on the device information display system 300 engages the computing device connector 506 on the rear surface 502b of the chassis 502. As discussed above, while two device information display systems are discussed as being connected to the computing device 500, in most embodiments only a single device information display system will be connected to the computing device 500.

Figure 10A:
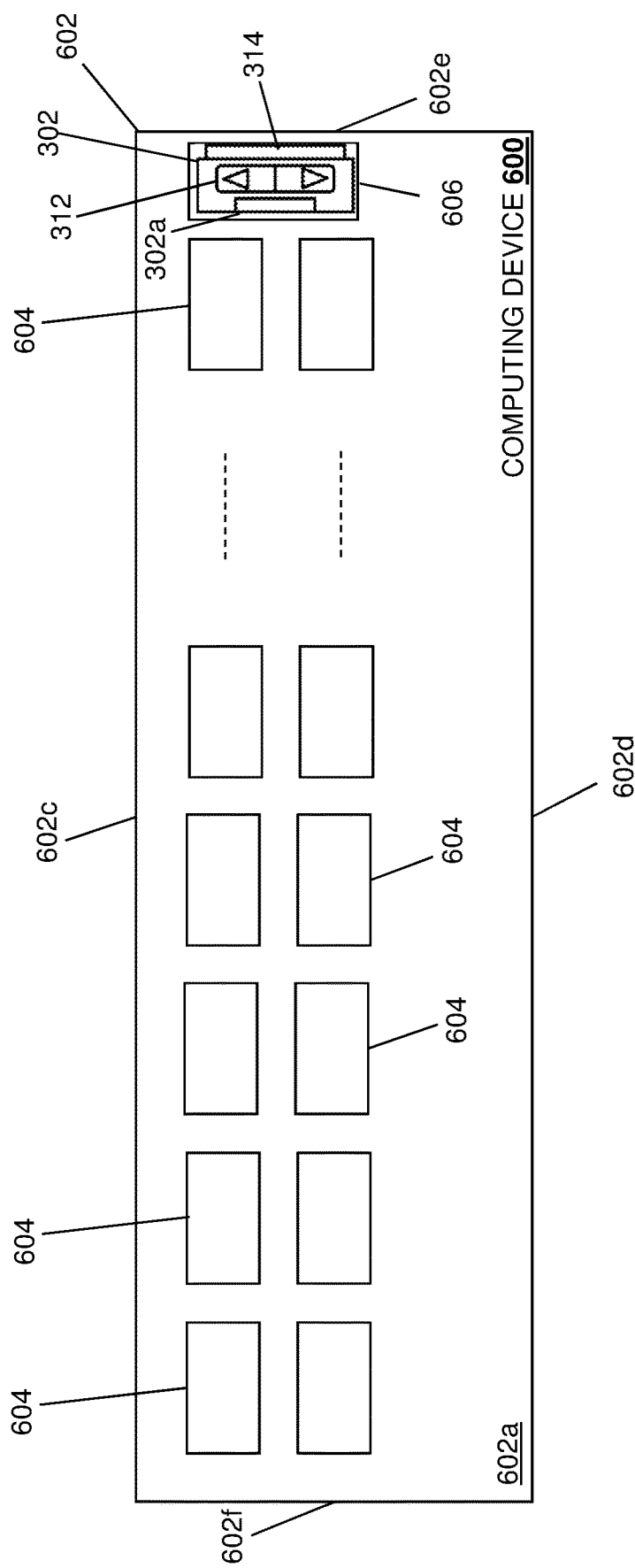
FIG. 10A is a schematic view illustrating an embodiment of the device information display system of FIGS. 3A-3C connected to the computing device of FIGS. 6A-6C during the method of FIG. 8.
Figure 10B:
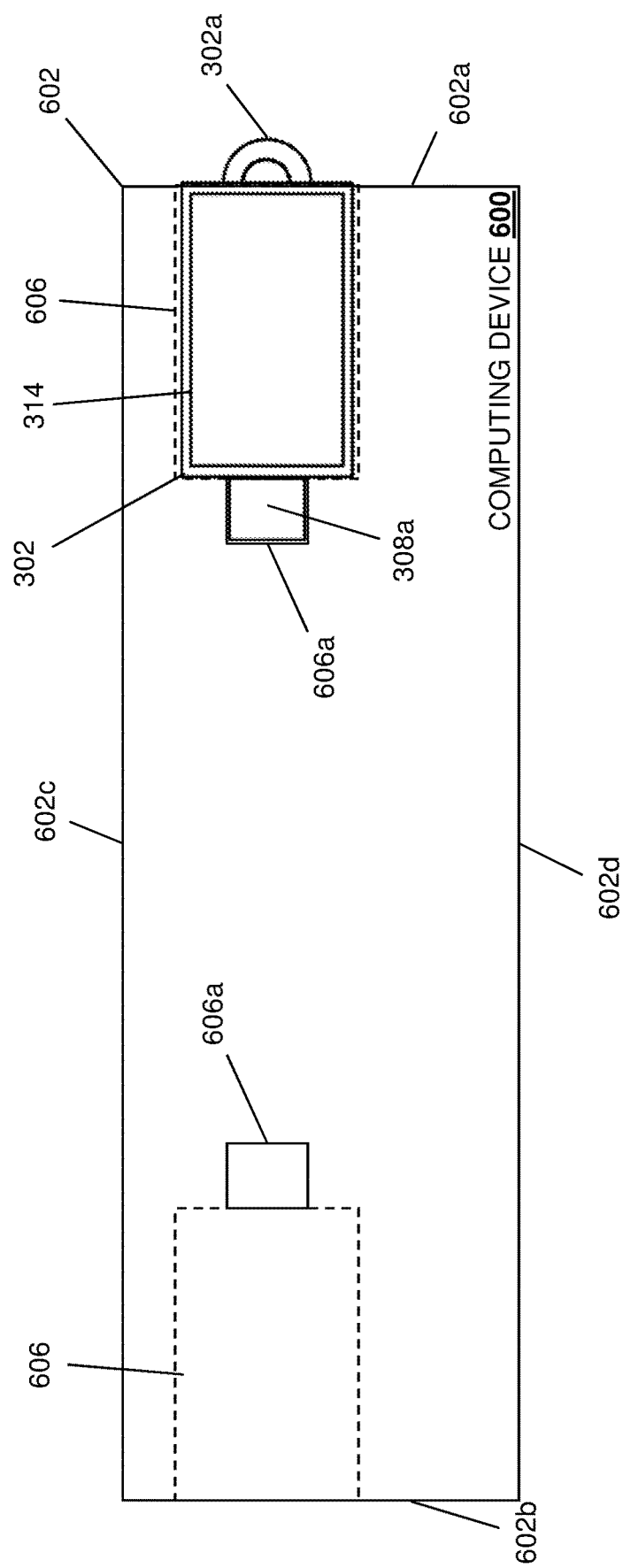
FIG. 10B is a schematic view illustrating an embodiment of the device information display system of FIGS. 3A-3C connected to the computing device of FIGS. 6A-6C during the method of FIG. 8.

With reference to FIGS. 10A and 10B, in an embodiment of block 802, the device information display system 300 may be connected to the computing device 600 by positioning the device information display system 300 adjacent the front surface 602a of the chassis 602 with the chassis 302 of the device information display system 300 aligned with the computing device information display chassis housing 606 on the front surface 602a of the chassis 602, and then moving the device information display system 300 towards the computing device 600 such that the device information display system 300 enters and moves through the computing device information display chassis housing 606 on the front surface 602a of the chassis 602 until the connector 308a on the device information display system 300 engages the computing device connector 606a adjacent the computing device information display chassis housing 606 defined by the chassis 602 adjacent its front surface 602a.

Figure 10C:
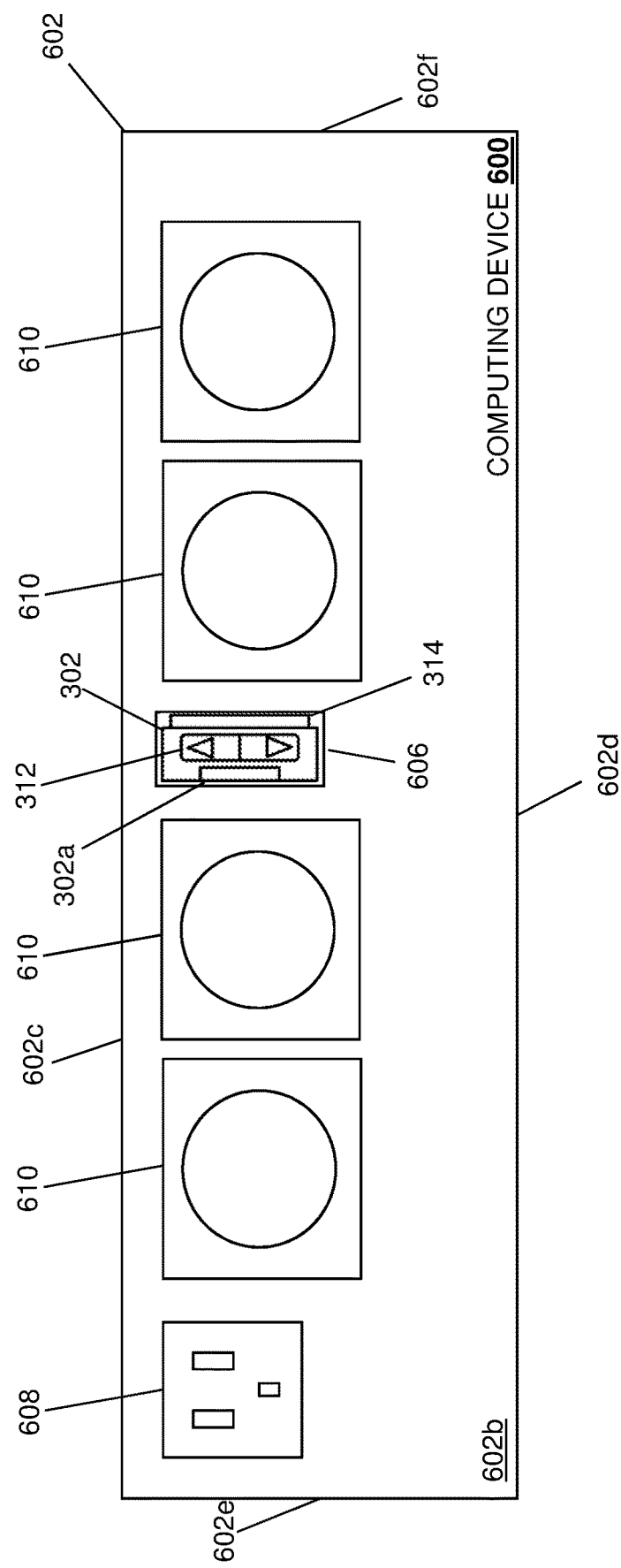
FIG. 10O is a schematic view illustrating an embodiment of the device information display system of FIGS. 3A-3C connected to the computing device of FIGS. 6A-6C during the method of FIG. 8.
FIG. 10D is a schematic view illustrating an embodiment of the device information display system of FIGS. 3A-3C connected to the computing device of FIGS. 6A-6C during the method of FIG. 8.
FIG. 10E is a schematic view illustrating an embodiment of the device information display system of FIGS. 3A-3C operating during the method of FIG. 8.
Figure 10D:
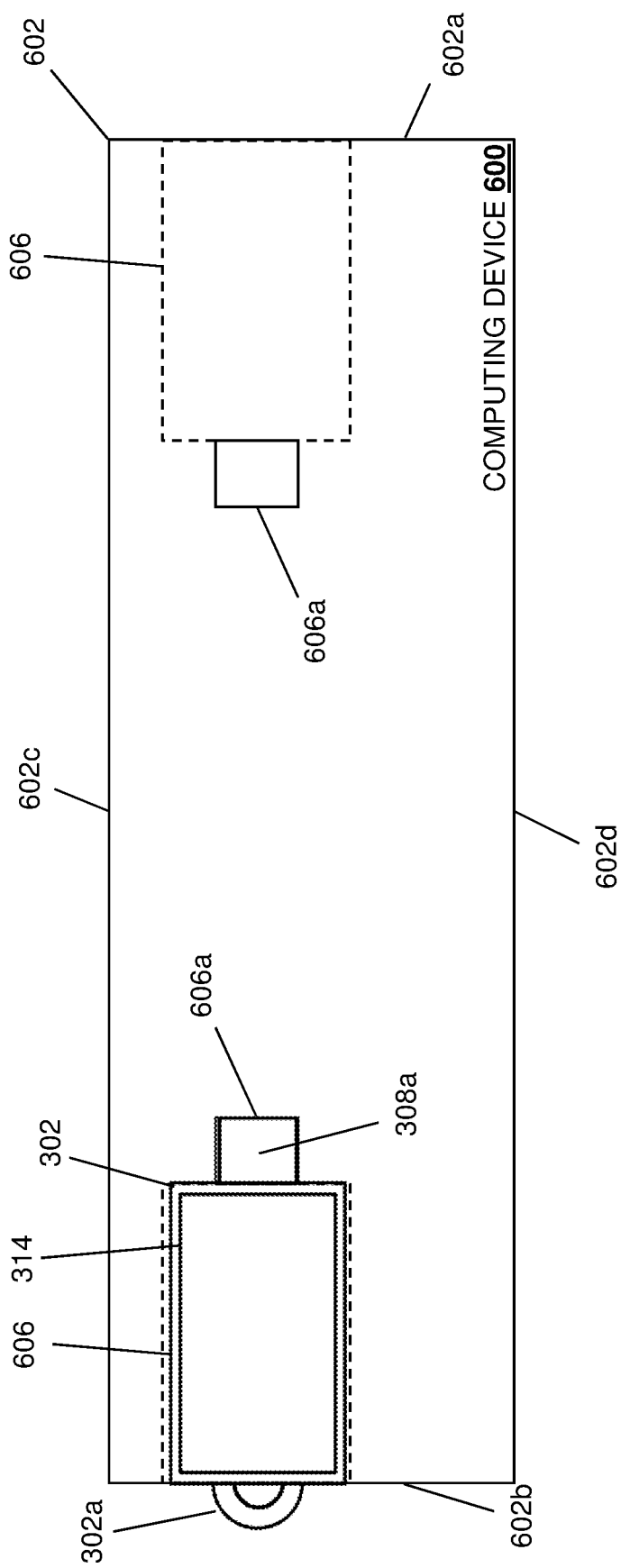

Similarly, with reference to FIGS. 10C and 10D, in an embodiment of block 802, the device information display system 300 may be connected to the computing device 600 by positioning the device information display system 300 adjacent the rear surface 602b of the chassis 602 with the chassis 302 of the device information display system 300 aligned with the computing device information display chassis housing 606 on the rear surface 602b of the chassis 602, and then moving the device information display system 300 towards the computing device 600 such that the device information display system 300 enters and moves through the computing device information display chassis housing 606 on the rear surface 602b of the chassis 602 until the connector 308a on the device information display system 300 engages the computing device connector 606a adjacent the computing device information display chassis housing 606 defined by the chassis 602 adjacent its rear surface 602b. As discussed above, while two device information display systems are discussed as being connected to the computing device 600, in most embodiments only a single device information display system will be connected to the computing device 600.

With reference to the embodiment of the computing device 700 of FIGS. 7A, 7B, and 7C that includes the device information display system 300 wired to the computing device 700, block 802 of the method 800 may be skipped, or may have been performed during the manufacture of the computing device 700. As discussed above, one of skill in the art in possession of the present disclosure will recognize how the wired device information display system communication coupling 706 may connect the device information display system 300 to the communication system 408 discussed above with reference to FIG. 4 and the rest of the components of the computing device 400/700. However, while several specific examples of the connection of the device information display system 300 have been described, one of skill in the art in possession of the present disclosure will appreciate how other connections of the device information display system 300 and computing devices will fall within the scope of the present disclosure as well. For example, wireless connections between the device information display system 300 and a computing device may be provided in place of the physical connections discussed above while remaining within the scope of the present disclosure as well.

The method 800 then proceeds to block 804 where the device information display system automatically receives device information associated with the computing device and stores the device information. In an embodiment, at block 804 and in response to being connected to a computing device (e.g., via the computing device connector(s) 506 in FIGS. 9A-9D, via the computing device connector(s) 606 in FIGS. 10A-10D), the device information retrieval engine 304 may operate to automatically receive device information associated with the computing device to which it is connected, and store that device information in the device information database 306. In one embodiment, in response to detecting the connection of the device information display system 300 to the computing device 400, the device information provisioning engine 404 may automatically transmit the device information via its communication system 408 to the device information display system 300.

In one example, the device information provisioning engine 404 may be provided by a remote access controller device such as the integrated DELL® Remote Access Controller (IDRAC) available from DELL® Inc. of Round Rock, Texas, United States, a Baseboard Management Controller (BMC), and/or other remote access controller devices known in the art, and in response to detecting the connection of the device information display system 300 to the computing device 400, the remote access controller device may automatically retrieve a text file that includes the device information and that is stored in the device information database 406, and may automatically transmit that text file via its communication system 408 to the device information display system 300. As such, the device information provisioning engine 404 may be configured with instructions to retrieve and transmit the text file automatically and without some subsequent instruction from a user in response to the detection of the connection of the device information display system 300 to the computing device 400, and the text file may include any of a variety of current device information for the computing device 400. However, while the transmission of a text file including the device information is discussed as being retrieved and transmitted by a remote access controller device in the computing device 400, one of skill in the art in possession of the present disclosure will appreciate that other computing subsystems (e.g., a Central Processing Unit (CPU), a Representational State Transfer (REST) subsystem, an open-source Ansible subsystem, an operating system, and/or other subsystems that would be apparent to one of skill in the art in possession of the present disclosure) may retrieve and transmit the text file discussed above while remaining within the scope of the present disclosure.

In other examples, the device information provisioning engine 404 may be provided by the remote access controller device, CPU, REST subsystem, open-source Ansible subsystem, operating system, and/or other subsystems discussed above, and in response to detecting the connection of the device information display system 300 to the computing device 400, the device information provisioning engine 404 may automatically generate and/or retrieve current device information for the computing device 400, and automatically transmit that device information via its communication system 408 to the device information display system 300. As such, the device information provisioning engine 404 may be configured with instructions to generate/retrieve and transmit the device information automatically and without any subsequent instruction from a user in response to the detection of the connection of the device information display system 300 to the computing device 400.

In yet other examples, the device information retrieval engine 304 in the device information display system 300 may be configured with instructions that, in response to detecting its connection to the computing device 400, cause the device information retrieval engine 304 to automatically generate and transmit (i.e., without some subsequent instruction from a user in response to the detection of the connection of the device information display system 300 to the computing device 400) commands that are configured to cause the device information provisioning engine 404 in the computing device 400 to retrieve and transmit the device information. For example, in response to detecting its connection to the computing device 400, the device information retrieval engine 304 may automatically generate and transmit "show" commands to an operating system that provides the device information provisioning engine 404 in the computing device 400, with those "show" commands causing that operating system to generate and transmit the device information to the device information display system 300. Furthermore, while described as being provided by an operating system that retrieves and transmits device information in response to "show" commands, the device information provisioning engine 404 may be provided by the remote access controller device, CPU, REST subsystem, open-source Ansible subsystem, and/or other subsystems discussed above, and may operate to generate and transmit the device information similarly as described above for the operating system, or may operate to retrieve and transmit the text file that includes the device information similarly as discussed above, while remaining within the scope of the present disclosure as well.

In specific examples, the device information included in the text file discussed above, or generated/retrieved by the device information provisioning engine 404 as discussed above, may include an Internet Protocol (IP) address for the computing device 400, a Media Access Control (MAC) address for the computing device 400, health information for the computing device 400, servicing information (e.g., a service "tag"/identifier for the computing device 400, an "express service code" for the computing device 400, etc.), model information (e.g., a model number) for the computing device 400, power supply information for the computing device 400 (e.g., a number of active Power Supply Units (PSUs), an indication of Alternating Current (AC) or Direct Current (DC) usage, etc.), fan system information for the computing device 400 (an indication of front-surface-to-rear-surface airflow or rear-surface-to-front-surface ("reverse") airflow, a number of active fan devices, etc.), system event information for the computing device 400, temperature information for the computing device 400 (e.g., for relatively high-wattage optics devices, out-of-boundary temperature sensors, etc.), as well as any other device information that would be apparent to one of skill in the art in possession of the present disclosure. Furthermore, in addition to the device information discussed above, the device information display system 300 may be configured to display a variety of other information (e.g., custom information provided in the computing device 400 by a network administrator or other user, a Quick Response (QR) code providing a link to a manufacturer website, etc.) while remaining within the scope of the present disclosure as well.

As such, with reference to the embodiment illustrated in FIGS. 9A-9E, the device information display system 300 may automatically receive device information associated with the computing device 500 from the computing device 500, and store that device information in its device information database 306. Similarly, with reference to the embodiment illustrated in FIGS. 10A-10E, the device information display system 300 may automatically receive device information associated with the computing device 600 from the computing device 600, and store that device information in it device information database 306. With reference to the embodiment illustrated in FIGS. 7A-7C, rather than automatically receiving device information in response to connecting to the computing device 700, the device information display system 300 may periodically automatically receive device information associated with the computing device 700 from the computing device 700 via the wired device information display system communication coupling 706, and may store that device information in its device information database 306.

Figure 9E:
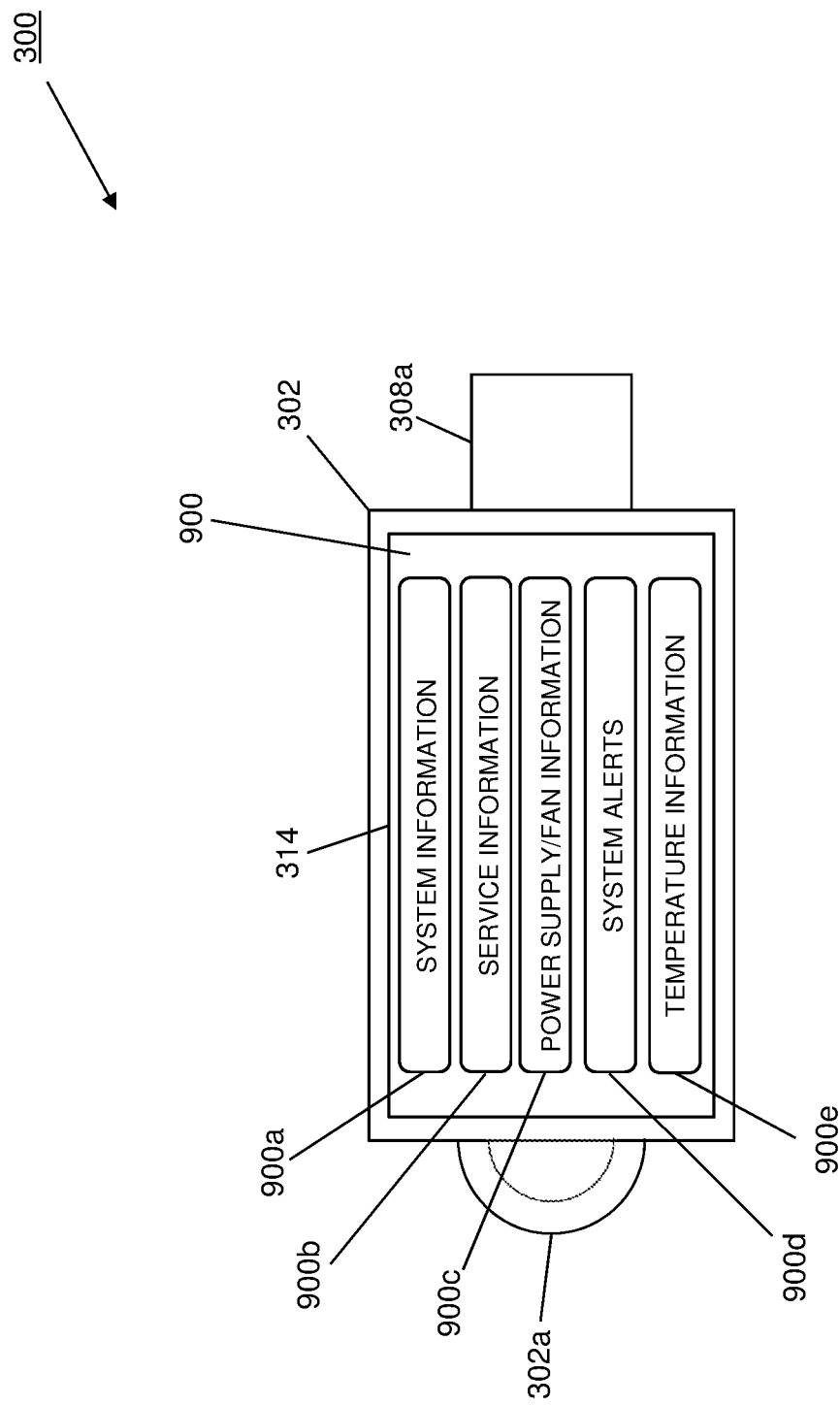
FIG. 9E is a schematic view illustrating an embodiment of the device information display system of FIGS. 3A-3C operating during the method of FIG. 8.

The method 800 then proceeds to block 806 where the device information display system displays the device information. With reference to FIG. 9E and the embodiment of FIGS. 9A-9D in which the device information display system 300 is connected to the computing device 500, at block 806 the device information display system 300 may display a device information display screen 900 that includes a system information Graphical User Interface (GUI) element 900a, a service information GUI element 900b, a power supply/fan information GUI element 900c, a system alert GUI element 900d, and a temperature information GUI element 900e. As will be appreciated by one of skill in the art in possession of the present disclosure, the system information GUI element 900a may provide access to the IP address for the computing device 500, the MAC address for the computing device 500, the health information for the computing device 500, and the model information (e.g., a model number) for the computing device 500, each of which may have been included in the device information as discussed above.

Similarly, the service information GUI element 900b may provide access to the servicing information such as the service "tag"/identifier for the computing device 500 and the "express service code" for the computing device 500, each of which may have been included in the device information as discussed above. Similarly, the power supply/fan information GUI element 900c may provide access to the power supply information for the computing device 500 (e.g., a number of active PSUs, an indication of AC or DC usage, etc.) and the fan system information for the computing device 500 (an indication of front-surface-to-rear-surface airflow or rear-surface-to-front-surface ("reverse") airflow, a number of active fan devices, etc.), each of which may have been included in the device information as discussed above. Similarly, the system alert GUI element 900d may provide access to the system event information for the computing device 500 that may be included in the device information as discussed above. Similarly, the temperature information GUI element 900e may provide access to the temperature information for the computing device (e.g., for relatively high-wattage optics devices, out-of-boundary temperature sensors, etc.) that may be included in the device information as discussed above. Furthermore, the device information display screen 900 may also display a variety of other information (e.g., custom information provided by a network administrator or other user, a Quick Response (QR) code providing a link to a manufacturer website, etc.) while remaining within the scope of the present disclosure as well.

Figure 10E:
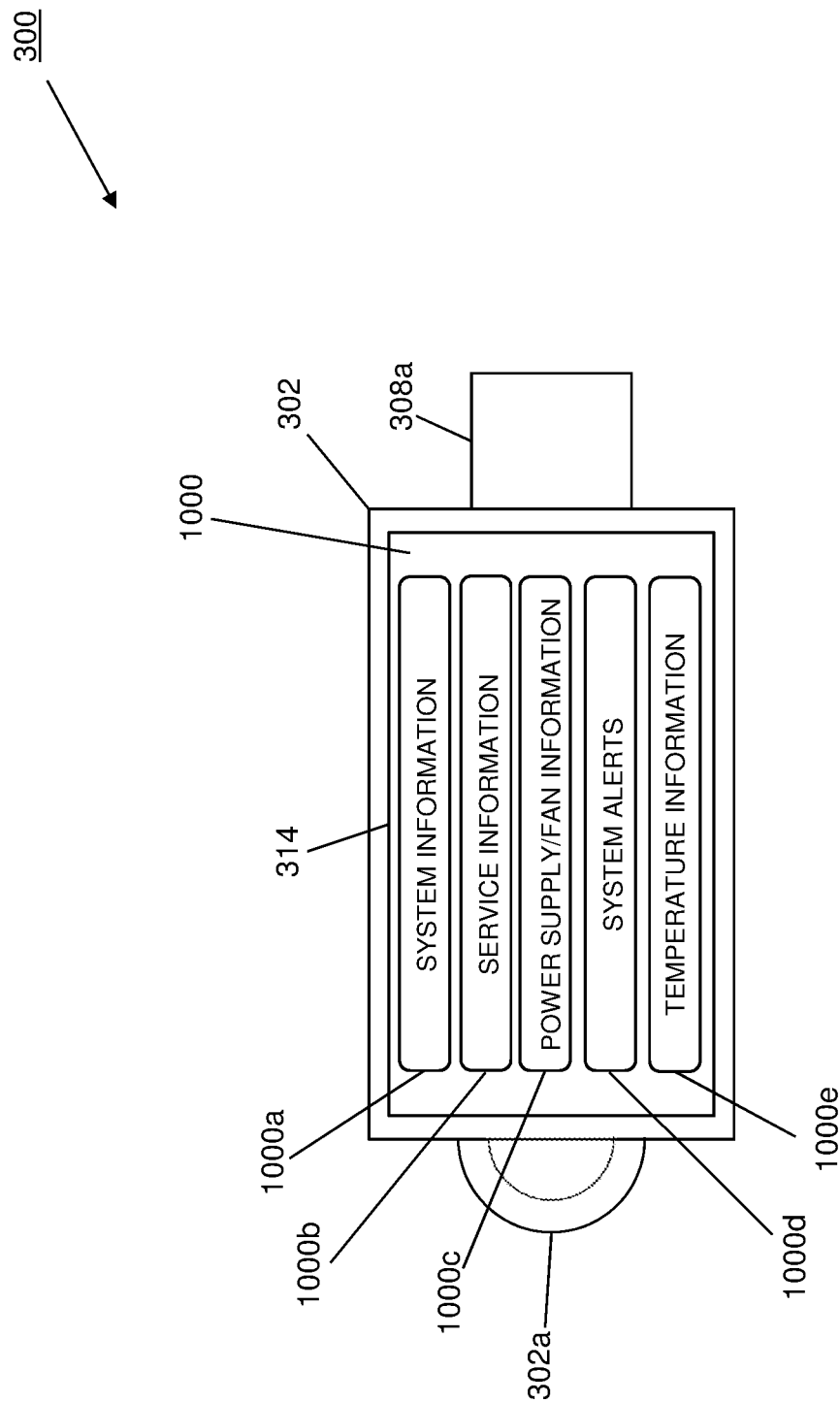

With reference to FIG. 10E and the embodiment of FIGS. 10A-10D in which the device information display system 300 is connected to the computing device 600, at block 806 the device information display system 300 may display a device information display screen 1000 that includes a system information Graphical User Interface (GUI) element 1000a, a service information GUI element 1000b, a power supply/fan information GUI element 1000c, a system alert GUI element 1000d, and a temperature information GUI element 1000e. As will be appreciated by one of skill in the art in possession of the present disclosure, the system information GUI element 1000a may provide access to the IP address for the computing device 600, the MAC address for the computing device 600, the health information for the computing device 600, and the model information (e.g., a model number) for the computing device 600, each of which may have been included in the device information as discussed above.

Similarly, the service information GUI element 1000b may provide access to the servicing information such as the service "tag"/identifier for the computing device 600 and the "express service code" for the computing device 600, each of which may have been included in the device information as discussed above. Similarly, the power supply/fan information GUI element 1000c may provide access to the power supply information for the computing device 600 (e.g., a number of active PSUs, an indication of AC or DC usage, etc.) and the fan system information for the computing device 600 (an indication of front-surface-to-rear-surface airflow or rear-surface-to-front-surface ("reverse") airflow, a number of active fan devices, etc.), each of which may have been included in the device information as discussed above. Similarly, the system alert GUI element 1000*d* may provide access to the system event information for the computing device 600 that may be included in the device information as discussed above. Similarly, the temperature information GUI element 1000*e* may provide access to the temperature information for the computing device (e.g., for relatively high-wattage optics devices, out-of-boundary temperature sensors, etc.) that may be included in the device information as discussed above. Furthermore, the device information display screen 1000 may also display a variety of other information (e.g., custom information provided by a network administrator or other user, a Quick Response (QR) code providing a link to a manufacturer website, etc.) while remaining within the scope of the present disclosure as well.

Figure 11:
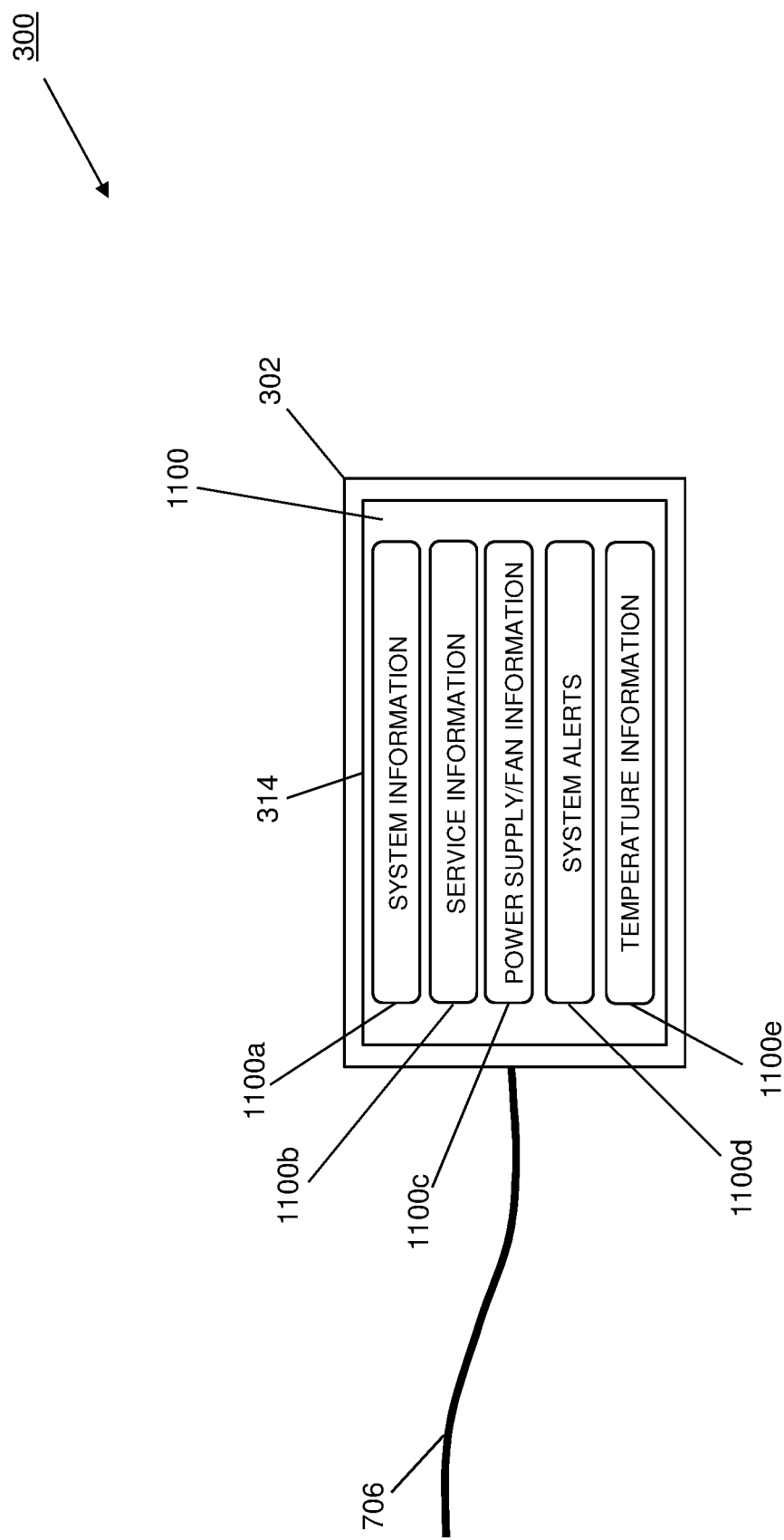
FIG. 11 is a schematic view illustrating an embodiment of the device information display system on the computing device of FIGS. 7A-7C operating during the method of FIG. 8.

With reference to FIG. 11 and the embodiment of FIGS. 7A-7C in which the device information display system 300 is wired to the computing device 700 via the wired device information display system communication coupling 706, at block 806 the device information display system 300 may display a device information display screen 1100 that includes a system information Graphical User Interface (GUI) element 1100*a*, a service information GUI element 1100*b*, a power supply/fan information GUI element 1100*c*, a system alert GUI element 1100*d*, and a temperature information GUI element 1100*e*. As will be appreciated by one of skill in the art in possession of the present disclosure, the system information GUI element 1100*a* may provide access to the IP address for the computing device 700, the MAC address for the computing device 700, the health information for the computing device 700, and the model information (e.g., a model number) for the computing device 700, each of which may have been included in the device information as discussed above.

Similarly, the service information GUI element 1100*b* may provide access to the servicing information such as the service "tag"/identifier for the computing device 700 and the "express service code" for the computing device 600, each of which may have been included in the device information as discussed above. Similarly, the power supply/fan information GUI element 1100*c* may provide access to the power supply information for the computing device 700 (e.g., a number of active PSUs, an indication of AC or DC usage, etc.) and the fan system information for the computing device 700 (an indication of front-surface-to-rear-surface airflow or rear-surface-to-front-surface ("reverse") airflow, a number of active fan devices, etc.), each of which may have been included in the device information as discussed above. Similarly, the system alert GUI element 1100*d* may provide access to the system event information for the computing device 700 that may be included in the device information as discussed above. Similarly, the temperature information GUI element 1100*e* may provide access to the temperature information for the computing device (e.g., for relatively high-wattage optics devices, out-of-boundary temperature sensors, etc.) that may be included in the device information as discussed above. Furthermore, the device information display screen 1100 may also display a variety of other information (e.g., custom information provided by a network administrator or other user, a Quick Response (QR) code providing a link to a manufacturer website, etc.) while remaining within the scope of the present disclosure as well.

The method 800 then proceeds to decision block 808 where the method 800 proceeds depending on whether the device information display system is disconnected from the computing device. In an embodiment, as long as the device information display system 300 remains connected to a computing device, that device information display system 300 may automatically receive any updates for the device information for that computing device, and then update the device information displayed by the device information display system 300 with those updates. However, in the event the device information display system 300 is disconnected to a computing device, that device information display system 300 may continue to display the device information for that computing device, and when that device information has been updated during its connection to the computing device, the device information display system 300 may display the latest update of the device information for that computing device (while in some embodiments erasing at least some older versions of the device information in order to save storage space).

Thus, if at decision block 806 the device information display system is not disconnected from the computing device, the method 400 returns to block 804 where the device information display system 300 may automatically receive and store device information associated with the computing device to which it was connected at block 802 (e.g., in the event that device information has changed and an update is available), and to block 806 with the device information display system 300 displays the device information 806. As such, the method 800 may loop such that the device information display system 300 automatically updates and displays device information for the computing devices as along as it is connected to that computing device.

As will be appreciated by one of skill in the art in possession of the present disclosure, the embodiment illustrated in FIGS. 9A-9E allows a user of the device information display system 300 to view the device information displayed (and updated) on the device information display screen 900 while the device information display system 300 is connected to the computing device 500. Thus, with reference to FIG. 9E, the user of the device information display system 300 may use the input subsystem 312 (or a "touch" input subsystem provided by the display subsystem 314) to select the system information GUI element 900*a* to access the IP address for the computing device 500, the MAC address for the computing device 500, the health information for the computing device 500, and the model information (e.g., a model number) for the computing device 500 while the device information display system 300 is connected to the computing device 500.

Similarly, the user of the device information display system 300 may use the input subsystem 312 (or a "touch" input subsystem provided by the display subsystem 314) to select the service information GUI element 900*b* to access the servicing information such as the service "tag"/identifier for the computing device 500 and the "express service code" for the computing device 500 while the device information display system 300 is connected to the computing device 500. Similarly, the user of the device information display system 300 may use the input subsystem 312 (or a "touch" input subsystem provided by the display subsystem 314) to select the power supply/fan information GUI element 900*c* to access the power supply information for the computing device 500 (e.g., a number of active PSUs, an indication of AC or DC usage, etc.) and the fan system information for the computing device 500 (an indication of front-surface-to-rear-surface airflow or rear-surface-to-front-surface ("reverse") airflow, a number of active fan devices, etc.) while the device information display system 300 is connected to the computing device 500. Similarly, the user of the device information display system 300 may use the input subsystem 312 (or a "touch" input subsystem provided by the display subsystem 314) to select the system alert GUI element 900d to access the system event information for the computing device 500 while the device information display system 300 is connected to the computing device 500. Similarly, the user of the device information display system 300 may use the input subsystem 312 (or a "touch" input subsystem provided by the display subsystem 314) to select the temperature information GUI element 900e to access the temperature information for the computing device (e.g., for relatively high-wattage optics devices, out-of-boundary temperature sensors, etc.) while the device information display system 300 is connected to the computing device 500.

As will also be appreciated by one of skill in the art in possession of the present disclosure, the embodiment illustrated in FIGS. 7A-7C/11 allows a user of the device information display system 300 to view the device information displayed (and updated) on the device information display screen 1100 provided on the device information display system 300 wired to the computing devices 700. As such, with reference to FIG. 11, the user of the device information display system 300 may use the input subsystem 312 (or a "touch" input subsystem provided by the display subsystem 314) to select the system information GUI element 1100a to access the IP address for the computing device 700, the MAC address for the computing device 700, the health information for the computing device 700, and the model information (e.g., a model number) for the computing device 700 displayed (and updated) on the device information display screen 1100 provided on the device information display system 300 wired to the computing devices 700. Similarly, the user of the device information display system 300 may use the input subsystem 312 (or a "touch" input subsystem provided by the display subsystem 314) to select the service information GUI element 1100b to access the servicing information such as the service "tag"/identifier for the computing device 5700 and the "express service code" for the computing device 700 displayed (and updated) on the device information display screen 1100 provided on the device information display system 300 wired to the computing devices 700.

Similarly, the user of the device information display system 300 may use the input subsystem 312 (or a "touch" input subsystem provided by the display subsystem 314) to select the power supply/fan information GUI element 1100c to access the power supply information for the computing device 700 (e.g., a number of active PSUs, an indication of AC or DC usage, etc.) and the fan system information for the computing device 700 (an indication of front-surface-to-rear-surface airflow or rear-surface-to-front-surface ("reverse") airflow, a number of active fan devices, etc.) displayed (and updated) on the device information display screen 1100 provided on the device information display system 300 wired to the computing devices 700. Similarly, the user of the device information display system 300 may use the input subsystem 312 (or a "touch" input subsystem provided by the display subsystem 314) to select the system alert GUI element 1100d to access the system event information for the computing device 700 displayed (and updated) on the device information display screen 1100 provided on the device information display system 300 wired to the computing devices 700. Similarly, the user of the device information display system 300 may use the input subsystem 312 (or a "touch" input subsystem provided by the display subsystem 314) to select the temperature information GUI element 1100e to access the temperature information for the computing device (e.g., for relatively high-wattage optics devices, out-of-boundary temperature sensors, etc.) displayed (and updated) on the device information display screen 1100 provided on the device information display system 300 wired to the computing devices 700.

If at decision block 806, the device information display system is disconnected from the computing device, the method 400 proceeds to block 810 where the device information display system displays the latest device information. In an embodiment, at block 810, the device information display system 300 may be disconnected from the computing device to which it was connected at block 802, and will operate (e.g., via power from the power subsystem 310) to continue to display the device information that was automatically received from that computing device at block 804. As will be appreciated by one of skill in the art in possession of the present disclosure, in the embodiment illustrated and discussed above with reference to FIGS. 10B and 10D, a user may disconnect the device information display system 300 by grasping the loop/handle element 302a in order to remove the device information display system 300 from the device information display chassis housing 606. As discussed above, in situations in which the device information displayed by the device information display system 300 was updated during its connection to the computing device, the latest device information (i.e., the most recently updated device information) from that computing device may be displayed by the device information display system 300 once it is disconnected from that computing device. Furthermore, as will be appreciated by one of skill in the art in possession of the present disclosure, the embodiment illustrated and discussed with reference to FIGS. 7A-7C/11 may not allow the device information display system 300 to be disconnected from the computing device 700, and thus block 810 may be skipped for embodiments in which the device information display system 300 is wired to the computing device 700 via the wired device information display system communication coupling 706.

Thus, with reference to FIG. 9E, the user of the device information display system 300 may use the input subsystem 312 (or a "touch" input subsystem provided by the display subsystem 314) to select the system information GUI element 900a to access the IP address for the computing device 500, the MAC address for the computing device 500, the health information for the computing device 500, and the model information (e.g., a model number) for the computing device 500 after the device information display system 300 has been disconnected from the computing device 500. Similarly, the user of the device information display system 300 may use the input subsystem 312 (or a "touch" input subsystem provided by the display subsystem 314) to select the service information GUI element 900b to access the servicing information such as the service "tag"/identifier for the computing device 500 and the "express service code" for the computing device 500 after the device information display system 300 has been disconnected from the computing device 500.

Similarly, the user of the device information display system 300 may use the input subsystem 312 (or a "touch" input subsystem provided by the display subsystem 314) to select the power supply/fan information GUI element 900c to access the power supply information for the computing device 500 (e.g., a number of active PSUs, an indication of AC or DC usage, etc.) and the fan system information for the computing device 500 (an indication of front-surface-to-rear-surface airflow or rear-surface-to-front-surface ("reverse") airflow, a number of active fan devices, etc.) after the device information display system 300 has been disconnected from the computing device 500. Similarly, the user of the device information display system 300 may use the input subsystem 312 (or a "touch" input subsystem provided by the display subsystem 314) to select the system alert GUI element 900*d* to access the system event information for the computing device 500 after the device information display system 300 has been disconnected from the computing device 500. Similarly, the user of the device information display system 300 may use the input subsystem 312 (or a "touch" input subsystem provided by the display subsystem 314) to select the temperature information GUI element 900*e* to access the temperature information for the computing device (e.g., for relatively high-wattage optics devices, out-of-boundary temperature sensors, etc.) after the device information display system 300 has been disconnected from the computing device 500.

Similarly, with reference to FIG. 10E, the user of the device information display system 300 may use the input subsystem 312 (or a "touch" input subsystem provided by the display subsystem 314) to select the system information GUI element 1000*a* to access the IP address for the computing device 600, the MAC address for the computing device 600, the health information for the computing device 600, and the model information (e.g., a model number) for the computing device 600 after the device information display system 300 has been disconnected from the computing device 600. Similarly, the user of the device information display system 300 may use the input subsystem 312 (or a "touch" input subsystem provided by the display subsystem 314) to select the service information GUI element 1000*b* to access the servicing information such as the service "tag"/identifier for the computing device 600 and the "express service code" for the computing device 600 after the device information display system 300 has been disconnected from the computing device 600.

Similarly, the user of the device information display system 300 may use the input subsystem 312 (or a "touch" input subsystem provided by the display subsystem 314) to select the power supply/fan information GUI element 1000*c* to access the power supply information for the computing device 600 (e.g., a number of active PSUs, an indication of AC or DC usage, etc.) and the fan system information for the computing device 600 (an indication of front-surface-to-rear-surface airflow or rear-surface-to-front-surface ("reverse") airflow, a number of active fan devices, etc.) after the device information display system 300 has been disconnected from the computing device 600. Similarly, the user of the device information display system 300 may use the input subsystem 312 (or a "touch" input subsystem provided by the display subsystem 314) to select the system alert GUI element 1000*d* to access the system event information for the computing device 600 after the device information display system 300 has been disconnected from the computing device 600. Similarly, the user of the device information display system 300 may use the input subsystem 312 (or a "touch" input subsystem provided by the display subsystem 314) to select the temperature information GUI element 1000*e* to access the temperature information for the computing device (e.g., for relatively high-wattage optics devices, out-of-boundary temperature sensors, etc.) after the device information display system 300 has been disconnected from the computing device 600.

Following any performance of the method 800, the method 800 may be repeated to connect the device information display systems 300 discussed above with regard to FIGS. 9A-9E and 10A-10E to a different computing device (e.g., different than the computing device to which it was connected during the previous performance of the method 800) and cause that device information display system 300 to automatically receive and display device information about that different computing device as well. In some embodiments, the device information display system 300 may be configured to store device information received from different computing devices, and the input subsystem 312 (or a "touch" input subsystem provided by the display device 314) may allow a user to select (e.g., scroll through) device information associated with different computing devices. As such, in a specific example, a user of the device information display system 300 may connect the device information display system 300 to (and disconnect the device information display system 300 from) each of the computing devices 204*a*-204*e* (e.g., one after the other), and then may view the device information for each of those computing devices 204*a*-204*e* using the device information display system 300. In some examples, the specific example of the collection of device information from multiple computing devices for later viewing discussed above may be facilitated by the device information display system 300 providing an indication (e.g., via the display subsystem 314) whenever the automatic receiving of the device information from any particular computing device has completed, thus alerting a user that they may disconnect the device information display system from that computing device and connect it to another computing device.

Thus, systems and methods have been described that provide dynamic/active device information "luggage" tags that may be connected to a computing device, automatically receive device information about that computing device, display and update that device information, and continue to display the latest updated device information after being disconnected from that computing device. As will be appreciated by one of skill in the art in possession of the present disclosure, the dynamic/active device information "luggage" tags of the present disclosure eliminate the need for console cables and/or console ports, management devices and drivers, adapter hardware, and knowledge of console settings (e.g., baud rate, parity, etc.) needed to access a CLI in a computing device in order to retrieve its device information, and operate to greatly reduce the amount of time needed to retrieve that device information from the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device information display system, comprising:
   a first computing device that defines a first device information display chassis housing and includes a first computing device connector located in the first device information display chassis housing;
   a device information display chassis that is dimensioned to enter and be housed in the first device information display chassis housing defined by the first computing device;

a display device that is included on the device information display chassis;

a device information display connector that is included on the device information display chassis and that is configured to connect to the first computing device connector on the first computing device; and a device information retrieval subsystem that is included in the device information display chassis and coupled to each of the display device and the device information display connector, wherein the device information retrieval subsystem is configured to:

automatically generate and transmit, in response to the device information display chassis entering and being housed in the first device information display chassis housing defined by the first computing device such that the device information display connector connects to the first computing device connector on the first computing device, at least one show command that is configured to cause the first computing device to automatically retrieve a first text file that includes first device information associated with the first computing device and transmit the first text file via the first computing device connector;

automatically receive, from the first computing device via the first computing device connector, the first text file including the first device information that was retrieved and transmitted by the first computing device;

provide, for display on the display device subsequent to the device information display connector being disconnected from the first computing device and using the first text file, a Graphical User Interface (GUI) that includes a plurality GUI elements that are each selectable using an input subsystem that is coupled to the device information retrieval subsystem in order to retrieve and display different subsets of the first device information that are included in the first text file.

2. The system of claim 1, further comprising:

a second computing device that defines a second device information display chassis housing and includes a second computing device connector located in the second device information display chassis housing, wherein the device information display chassis is dimensioned to enter and be housed in the second device information display chassis housing defined by the second computing device, the device information display connector is configured to connect to the second computing device connector on the second computing device, and the device information retrieval subsystem is configured to:

automatically generate and transmit, in response to the device information display chassis entering and being housed in the second device information display chassis housing defined by the second computing device such that the device information display connector connects to the second computing device connector on the second computing device, the at least one show command that is configured to cause the second computing device to automatically retrieve a second text file that includes second device information associated with the second computing device and transmit the second text file via the second computing device connector;

automatically receive, from the second computing device via the second computing device connector, the second text file including the second device information that was retrieved and transmitted by the second computing device; and provide, for display on the display device subsequent to the device information display connector being disconnected from the second computing device and using the second text file, the GUI that includes the plurality GUI elements that are each selectable using the input subsystem that is coupled to the device information retrieval subsystem in order to retrieve and display different subsets of the second device information that are included in the second text file.

3. The system of claim 2, wherein the device information retrieval subsystem is configured to:

store, in a device information database included in the device information display chassis, the first device information and the second device information;

receive, via the GUI and the input subsystem that is coupled to the device information retrieval subsystem subsequent to the device information display connector being disconnected from the first computing device and the second computing device, a first request to display the first device information and, in response, display the first device information stored in the device information database using the GUI; and receive, via the GUI and the input subsystem that is coupled to the device information retrieval subsystem subsequent to the device information display connector being disconnected from the first computing device and the second computing device, a second request to display the second device information and, in response, display the second device information stored in the device information database using the GUI.

4. The system of claim 1, wherein the display device is a touch-screen display device that provides the input subsystem that is coupled to the device information retrieval subsystem.

5. The system of claim 1, wherein the at least one show command is configured to cause a Baseboard Management Controller (BMC) in the first computing device to automatically retrieve the first text file that includes the first device information associated with the first computing device and transmit the first text file via the first computing device connector.

6. The system of claim 1, wherein the device information includes at least one of an Internet Protocol (IP) address, a Media Access Control (MAC) address, computing device health information, computing device servicing information, and computing device model information, computing device component information, and computing device event information.

7. An Information Handling System (IHS), comprising:

a plurality of computing devices that each define a respective device information display chassis housing and that each include a respective computing device connector located in the device information display chassis housing defined by that computing device; and a device information display system, comprising:

a device information display chassis that is dimensioned to enter and be housed in the respective device information display chassis housing defined by each of plurality of computing devices;

a processing system that is housed in the device information display chassis; and a memory system that is housed in the device information display chassis, that is coupled to the processing system, and that includes instructions that, when executed by the processing system, cause the processing system to provide a device information retrieval engine that is configured to:

automatically generate and transmit, in response to the device information display chassis entering and being housed in the respective device information display chassis housing defined by a first computing device included in the plurality of computing devices such that the device information display system connects to the respective computing device connector on the first computing device, at least one show command that is configured to cause the first computing device to automatically retrieve a first text file that includes first device information associated with the first computing device and transmit the first text file via the first computing device connector;

automatically receive, from the first computing device via the first computing device connector, the first text file including the first device information that was retrieved and transmitted by the first computing device;

provide, for display subsequent to the device information display system being disconnected from the first computing device and using the first text file, a Graphical User Interface (GUI) that includes a plurality GUI elements that are each selectable using an input subsystem that is coupled to the device information retrieval engine in order to retrieve and display different subsets of the first device information that are included in the first text file.

8. The IHS of claim 7, wherein the device information retrieval engine that is configured to:

automatically generate and transmit, in response to the device information display chassis entering and being housed in the respective device information display chassis housing defined by a second computing device included in the plurality of computing devices such that the device information display system connects to the respective computing device connector on the second computing device, the at least one show command that is configured to cause the second computing device to automatically retrieve a second text file that includes second device information associated with the second computing device and transmit the second text file via the second computing device connector;

automatically receive, from the second computing device via the second computing device connector, the second text file including the second device information that was retrieved and transmitted by the second computing device; and provide, for display subsequent to the device information display system being disconnected from the second computing device and using the second text file, the GUI that includes the plurality GUI elements that are each selectable using the input subsystem that is coupled to the device information retrieval engine in order to retrieve and display different subsets of the second device information that are included in the second text file.

9. The IHS of claim 8, wherein the device information retrieval engine is configured to:

store, in a device information database included in the device information display system, the first device information and the second device information;

receive, via the GUI and the input subsystem that is coupled to the device information retrieval engine subsequent to the device information display system being disconnected from the first computing device and the second computing device, a first request to display the first device information and, in response, display the first device information stored in the device information display system using the GUI; and receive, via the GUI and the input subsystem that is coupled to the device information retrieval engine subsequent to the device information display system being disconnected from the first computing device and the second computing device, a second request to display the second device information and, in response, display the second device information stored in the device information display system using the GUI.

10. The IHS of claim 7, wherein the GUI that includes the plurality GUI elements is displayed on a touch-screen display device that provides the input subsystem that is coupled to the device information retrieval engine.

11. The IHS of claim 7, wherein the at least one show command is configured to cause a Baseboard Management Controller (BMC) in the first computing device to automatically retrieve the first text file that includes the first device information associated with the first computing device and transmit the first text file via the first computing device connector.

12. The IHS of claim 7, wherein the device information includes at least one of an Internet Protocol (IP) address, a Media Access Control (MAC) address, computing device health information, computing device servicing information, and computing device model information, computing device component information, and computing device event information.

13. The IHS of claim 7, wherein the device information display system includes a handle that is configured to extend from the device information display chassis housing defined by each of the plurality of computing devices when the device information display system is housed in that device information display chassis housing.

14. A method for displaying device information, comprising:

automatically generating and transmitting, by a device information display system in response to a device information display chassis of the device information display system entering and being housed in a first device information display chassis housing defined by a first computing device such that a device information display connector included on the device information display system connects to a first computing device connector included on the first computing device adjacent the first device information display chassis housing, at least one show command that is configured to cause the first computing device to automatically retrieve a first text file that includes first device information associated with the first computing device and transmit the first text file via the first computing device connector;

automatically receiving, by the device information display system from the first computing device via the second computing device connector, the first text file including the first device information that was retrieved and transmitted by the first computing device; and providing, by the device information display system for display subsequent to the device information display system being disconnected from the first computing device and using the first text file, a Graphical User Interface (GUI) that includes a plurality GUI elements that are each selectable using an input subsystem on the device information display system in order to retrieve and display different subsets of the first device information that are included in the first text file.

15. The method of claim 14, further comprising:
automatically generating and transmitting, by the device information display system in response to the device information display chassis of the device information display system entering and being housed in a second device information display chassis housing defined by a second computing device such that the device information display connector included on the device information display system connects to a second computing device connector included on the second computing device adjacent the second device information display chassis housing, the at least one show command that is configured to cause the second computing device to automatically retrieve a second text file that includes second device information associated with the second computing device and transmit the second text file via the second computing device connector;
automatically receiving, by the device information display system from the second computing device via the second computing device connector, the second text file including the second device information that was retrieved and transmitted by the second computing device; and
providing, by the device information display system for display subsequent to the device information display system being disconnected from the second computing device and using the second text file, the GUI that includes the plurality GUI elements that are each selectable using the input subsystem that is coupled to the device information retrieval subsystem in order to retrieve and display different subsets of the second device information that are included in the second text file.

16. The method of claim 15, further comprising:
storing, by the device information display system a device information database, the first device information and the second device information;

receiving, by the device information display system via the GUI and the input subsystem on the device information display system subsequent to the device information display system being disconnected from the first computing device and the second computing device, a first request to display the first device information and, in response, displaying the first device information using the GUI; and
receiving, by the device information display system via the GUI and the input subsystem on the device information display system subsequent to the device information display system being disconnected from the first computing device and the second computing device, a second request to display the second device information and, in response, displaying the second device information using the GUI.

17. The method of claim 14, wherein the GUI that includes the plurality GUI elements is displayed on a touch-screen display device that provides the input subsystem on the device information display system.

18. The method of claim 14, wherein the at least one show command is configured to cause a Baseboard Management Controller (BMC) in the first computing device to automatically retrieve the first text file that includes the first device information associated with the first computing device and transmit the first text file via the first computing device connector.

19. The method of claim 14, wherein the device information includes at least one of an Internet Protocol (IP) address, a Media Access Control (MAC) address, computing device health information, computing device servicing information, and computing device model information, computing device component information, and computing device event information.

20. The method of claim 14, wherein the device information display system includes a handle that is configured to extend from the first device information display chassis housing defined by the first computing device when the device information display system is housed in the first device information display chassis housing.

* * * * *

UNITED STATES PATENT AND TRADEMARK OFFICE
CERTIFICATE OF CORRECTION

| | | |
|---|---|---|
| PATENT NO. | : 11,837,192 B2 | Page 1 of 1 |
| APPLICATION NO. | : 17/395732 | |
| DATED | : December 5, 2023 | |
| INVENTOR(S) | : Montgomery et al. | |

It is certified that error appears in the above-identified patent and that said Letters Patent is hereby corrected as shown below:

In the Specification

Column 3, Line 20, "FIG. 100" should read --FIG. 10C--

Column 11, Line 1, "FIGS. 100 and 10D" should read --FIGS. 10C and 10D--

In the Claims

Claim 1, Column 21, Line 29, should read as follows:
--device; and--

Claim 7, Column 23, Line 23, should read as follows:
--first computing device; and--

Signed and Sealed this
Thirtieth Day of January, 2024

Katherine Kelly Vidal
*Director of the United States Patent and Trademark Office*